US012588609B2

(12) United States Patent
True

(10) Patent No.: US 12,588,609 B2
(45) Date of Patent: Mar. 31, 2026

(54) PLANT NUTRIENT PREPARATION AND DELIVERY SYSTEM

(71) Applicant: Nicholas True, Neenah, WI (US)

(72) Inventor: Nicholas True, Neenah, WI (US)

(*) Notice: Subject to any disclaimer, the term of this patent is extended or adjusted under 35 U.S.C. 154(b) by 0 days.

(21) Appl. No.: 18/195,873

(22) Filed: May 10, 2023

(65) Prior Publication Data

US 2023/0363332 A1 Nov. 16, 2023

Related U.S. Application Data

(60) Provisional application No. 63/341,316, filed on May 12, 2022.

(51) Int. Cl.
　A01G 31/02 (2006.01)
　B01F 35/20 (2022.01)
(52) U.S. Cl.
　CPC .............. A01G 31/02 (2013.01); B01F 35/20 (2022.01)
(58) Field of Classification Search
　CPC ... A01C 23/042; A01G 31/02; B01F 27/1124; B01F 2101/32; B01F 31/441
　See application file for complete search history.

(56) References Cited

U.S. PATENT DOCUMENTS 1,590,831 A * 6/1926 Jones .................. A47J 43/1081
　　　　　　　　　　　　　　　　366/260
2,831,753 A * 4/1958 Cash .................. B01F 33/8305
　　　　　　　　　　　　　　　　422/255

4,312,596 A * 1/1982 Maezawa ............ B01F 27/1125
　　　　　　　　　　　　　　　　366/343
5,580,169 A * 12/1996 Ghidini ............... A47J 43/1081
　　　　　　　　　　　　　　　　366/256

(Continued)

FOREIGN PATENT DOCUMENTS

CN 　106540621 A * 3/2017
CN 　107969336 A * 5/2018

(Continued)

OTHER PUBLICATIONS

Digital Timer. https://hydrobuilder.com/grow-light-bulbs-ballasts-hoods/lighting-controls-timers/light-timers/autopilot-7-day-dual-outlet-digital-timer.html. Accessed Feb. 14, 2022.

(Continued)

*Primary Examiner* — Claire X Wang
*Assistant Examiner* — Patrick M McCarty
(74) *Attorney, Agent, or Firm* — Foley & Lardner LLP

(57) ABSTRACT

A plant nutrition system includes a reservoir configured to receive a fluid and a nutrient, a lid coupled to a top portion of the reservoir, and a measuring device coupled to the lid, where the measuring device is configured to provide the nutrient to the reservoir, a mixer is coupled to the lid and positioned within the reservoir and is configured to be manipulated to selectively mix the fluid and the nutrient to form a nutrient solution, a pump is positioned within the reservoir and is configured to move the nutrient solution from the reservoir, and a chamber houses a test kit and is configured to receive the nutrient solution from the pump, and the test kit is configured to interact with the nutrient solution in the chamber and to provide a test result relating to the nutrient solution.

15 Claims, 24 Drawing Sheets

(56) References Cited

U.S. PATENT DOCUMENTS

| | | | | |
|---|---|---|---|---|
| 6,283,627 | B1 * | 9/2001 | Fromm | B01F 33/5011 |
| | | | | 366/332 |
| 2004/0108261 | A1 * | 6/2004 | King | E04H 4/1281 |
| | | | | 210/198.1 |
| 2010/0218423 | A1 * | 9/2010 | Walhovd | A01G 31/02 |
| | | | | 47/62 A |
| 2016/0120187 | A1 * | 5/2016 | Hahn | A01N 63/50 |
| | | | | 435/307.1 |
| 2016/0317989 | A1 * | 11/2016 | Nagler | B01F 33/813 |
| 2020/0060107 | A1 * | 2/2020 | Caselli | A01G 31/02 |
| 2022/0201926 | A1 * | 6/2022 | Bertram | A01C 7/004 |
| 2022/0232786 | A1 * | 7/2022 | Noble | A01G 31/02 |
| 2022/0295691 | A1 * | 9/2022 | Barhai | A01C 21/007 |

FOREIGN PATENT DOCUMENTS

| | | | |
|---|---|---|---|
| CN | 110122300 A | * | 8/2019 |
| KR | 101408208 B1 | * | 7/2014 |
| KR | 20210015003 A | * | 2/2021 |

OTHER PUBLICATIONS

Flooding Table. https://seedspotter.com/media/content/uploads/2014/08/12/eb-flow-systems.jpg> Accessed Feb. 14, 2022.
Hydroponic Bucket System. https://supercloset.com/products/buckets-for-hydroponics-6-site. Accessed Feb. 14, 2022.
Hydroponic System. https://www.htgsupply.com/products/class-5-ebb-flow-hydroponic-system/. Accessed Feb. 14, 2022.
Inline Pump. https://www.hawthornegc.com/shop/bybrand/eco-plus. Accessed. Feb. 14, 2022.
Inline Pump. https://www.hawthornegc.com/shop/product/ecoplus-eco-fixed-flow-rate-submersible-pumps. Accessed Feb. 14, 2022.
Measuring Cup. https://www.aliexpress.com/w/wholesale-small-plastic-measuring-cups.html. Accessed Feb. 14, 2022.
Nutrient Delivery System. https://www.dosatron.com/en-us/nutrient-delivery-system. Accessed Feb. 14, 2022.
Nutrients. https://www.advancednutrients.com/products/. Accessed Feb. 14, 2022.
PH Controller. https://bluelab.com/USA/shop/device-type/monitors-controllers. Accessed Feb. 14, 2022.
PH Pen. https://bluelab.com/USA/bluelab-ph-pen. Accessed Feb. 14, 2022.
Pump Adapter. https://groindoor.com/products/hydroponics-water-pumps-water-pump-accessories-active-aqua-bottom-draw-pump-adapter-aapw1000-3-4-inlet-thread. Accessed Feb. 14, 2022.
Solenoid Valve. https://ussolid.com/u-s-solid-electric-solenoid-valve-1-110v-ac-solenoid-valve-brass-body-normally-closed-viton-seal.html?msclkid=dc26e9f0ca6e1cfb69e88be54927fa2d&utm_source=bing&utm_medium=cpc&utm_campaign=U.S.%20Solid-SV-shopping&utm_term=4580909046446861&utm_content=solenoid%20valve. Accessed Feb. 14, 2022.
True Solutions LLC. "Preparation Station brochure," advertised on Apr. 4, 2020 (1 page).
Tubing Stake. https://www.rainbird.com/products/universal-14-drip-tubing-stake. Accessed Feb. 14, 2022.

* cited by examiner

414

PLANT NUTRIENT PREPARATION AND DELIVERY SYSTEM

CROSS-REFERENCE TO RELATED APPLICATIONS

This application claims the benefit of and priority to U.S. Provisional Application No. 63/341,316, filed on May 12, 2022, the entire disclosure of which is hereby incorporated by reference herein and for all purposes.

TECHNICAL FIELD

The present disclosure relates generally to a nutrient preparation system. More specifically, the present disclosure relates to a plant nutrient solution preparation, mixing, balancing, and delivery system.

BACKGROUND

Currently, certain systems and devices that aim to prepare and deliver plant nutrient solutions to living plants and vegetables exist. However, the industry currently lacks an affordable nutrient system that accurately and efficiently measures, mixes, aerates, balances, and/or delivers nutrient solution that addresses the needs of both soil grown, and hydroponically grown, plants and vegetation. More specifically, some systems fail to use pumps and pump systems efficiently and/or economically. Some systems aim to work quickly, and fail to accurately mix, aerate, and/or balance nutrient solutions. Yet other systems fail to satisfy industry needs and/or expectations due to safety, accuracy, and/or consistency standards. As such, there is currently a need in the industry for a plant nutrient system that accurately and effectively measures, mixes, aerates, balances, and/or delivers nutrient solution to plants and vegetation.

SUMMARY

At least one embodiment relates to a plant nutrition system. The plant nutrition system includes a reservoir configured to receive a fluid and a predetermined amount of nutrient and a measuring device coupled to the reservoir, where the measuring device is configured to provide the predetermined amount of nutrient to the reservoir. The plant nutrition system also includes a mixer positioned within the reservoir, where the mixer is configured to be manipulated to selectively mix the fluid and the predetermined amount of nutrient to form a nutrient solution. The plant nutrition system further includes a pump positioned within the reservoir, where the pump is configured to selectively mix the fluid and the nutrient to form the nutrient solution, and where the pump is configured to move the nutrient solution from the reservoir. The plant nutrition system also includes a chamber that houses a test kit, where the chamber is configured to receive the nutrient solution from the pump, and the test kit is configured to interact with the nutrient solution in the chamber and to provide a test result relating to the nutrient solution.

Some embodiments relate to a system. The system includes a reservoir and a controller. The reservoir is configured to receive a fluid and a predetermined amount of nutrient. The controller is configured to create a nutrient solution, using a pump and a mixer positioned within the reservoir, by mixing the fluid and the predetermined amount of the nutrient. The controller is further configured to provide the nutrient solution to a chamber having a test kit, where the chamber is configured to receive the nutrient solution from the pump, and the test kit is configured to interact with the nutrient solution in the chamber and provide a test result relating to the nutrient solution. The controller is further configured to provide the nutrient solution to at least one plant, where the nutrient solution is provided to the at least one plant with a delivery manifold.

Some embodiments relate to a kit. The kit includes a reservoir that is configured to receive a fluid and a predetermined amount of nutrient and a measuring device that is configured to couple the reservoir and provide the predetermined amount of nutrient to the reservoir. The kit further includes a mixer that is configured to be manipulated to selectively mix the fluid and the predetermined amount of nutrient to form a nutrient solution, and a pump that is configured to selectively mix the fluid and the nutrient to form the nutrient solution, and move the nutrient solution from the reservoir. The kit also includes a chamber housing a test kit, where the chamber is configured to receive the nutrient solution, and where the test kit is configured to interact with the nutrient solution and provide a test result relating to the nutrient solution.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
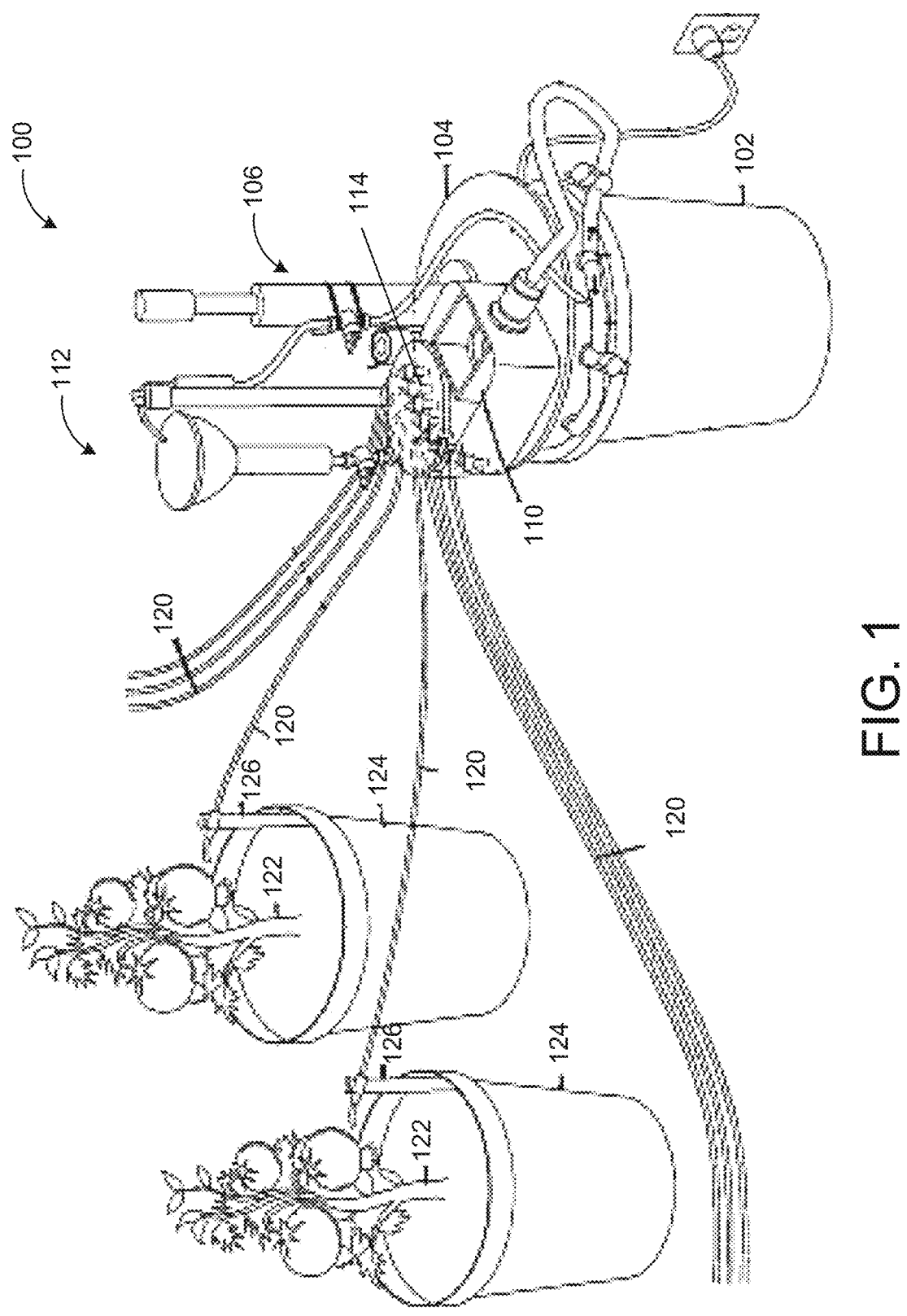
FIG. 1 is a perspective view of a nutrient preparation and delivery (NPD) system, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, apparatuses, systems, and methods for preparing, mixing, balancing, and/or delivering a nutrient solution for/to plants and/or vegetation via a nutrient preparation and delivery ("NPD") system according to one or more example embodiments are shown and described. According to an exemplary embodiment, the components of the NPD system are configured to measure, mix, balance, and/or deliver a nutrient solution to at least one plant and/or vegetation. More specifically, the NPD system is an integrated system that is configured to precisely prepare an appropriate amount of a fluid and a nutrient, adequately mix the fluid and the nutrient to form a nutrient solution, test the properties of the nutrient solution to determine whether additional preparation and/or mixing should be completed to obtain an appropriate nutrient solution (e.g., balance), and/or deliver the nutrient solution to at least one plant and/or vegetation. In this regard, the NPD system is a more efficient (e.g., cost, time, etc.) and more precise way of preparing, mixing, balancing, and/or delivering a nutrient solution compared to traditional systems. For example, the NPD system may provide a nutrient solution having a desirable saturation level, such that a predetermined percentage of the nutrient solution runs off of the plants and/or vegetation (e.g., 20%, etc.) resulting in runoff of undesirable fertilizer, salt buildup, etc. Further, the integrated NPD system reduces the risk of contamination compared to traditional systems, and allows for more accurate delivery of a nutrient solution. For example, the NPD system may distribute the nutrient solution at a rate that is consistent with a plant's and/or vegetation's growing medium (e.g., coco fiber, rockwool, hydrocoral, perlite, sand, compost, lime, peatmoss, worm castings, bat guano, etc.), such a desirable portion of the nutrient solution is runoff and/or the growing medium receives a suitable portion of the nutrient solution.

In an exemplary embodiment, the NPD system includes one or more components configured to mix the nutrient and/or nutrient solution. In some instances, mixing with hand tools (e.g., kitchen utensils, an old yardstick, etc.) can result in the solution being displaced, causing it to spill over the rim of the reservoir, which can leave a mess that is often time-consuming to clean and/or could cause damage to the surrounding surfaces (e.g., counters, floors, work benches, etc.). In an exemplary embodiment, the NPD system includes a mixing paddle that has a grate or grid design, which is configured to facilitate aeration and mixing of nutrient and/or nutrient solution. In addition, in an exemplary embodiment the design of the mixing paddle advantageously allows a nutrient solution to be quickly agitated with a minimal amount of displacement. For example, the mixing paddle's sleek framed body comprises a series of interstices, orifices, cavities, or apertures. When the paddle is plunged into a contained volume of liquid (e.g., nutrient solution), the paddle limits displacement of the fluid, thereby reducing the risk of creating a wake that spills over the sides of the container, because the mixing paddles orifices provide space for the liquid to occupy. In an exemplary embodiment, the mixing paddle of the present disclosure advantageously provides a series of orifices or apertures that break up the contents of a fluid, rather than pushing the fluid around. In this regard, with every plunge of the paddle into and out of the liquid (e.g., nutrient solution), a user introduces air to the fluid by breaking it up, thereby allowing air to be folded into the formulation.

Referring now to FIG. 1, a nutrient preparation and delivery system is shown, according to an exemplary embodiment. As shown in FIG. 1, the nutrient preparation and delivery system 100 (herein after "NPD system 100") includes a reservoir 102, a lid 104, a mixer 106, and a pump 108 (as shown in at least FIG. 2). Further, the NPD system 100 may include a chamber 110, a measuring device 112, and a delivery manifold 114. In some embodiments, the NPD system 100 includes additional, fewer, and/or different working components. For example, the NPD system 100 may also include adapters, couplers, junctions, tubing, fittings (e.g., bottom draw fitting, a bottom draw fitting for a pump, side draw fitting, etc.), fit valves, valves, sensors, timers, and/or any other suitable components configured to prepare, mix, balance, and/or deliver a nutrient solution.

Figure 2:
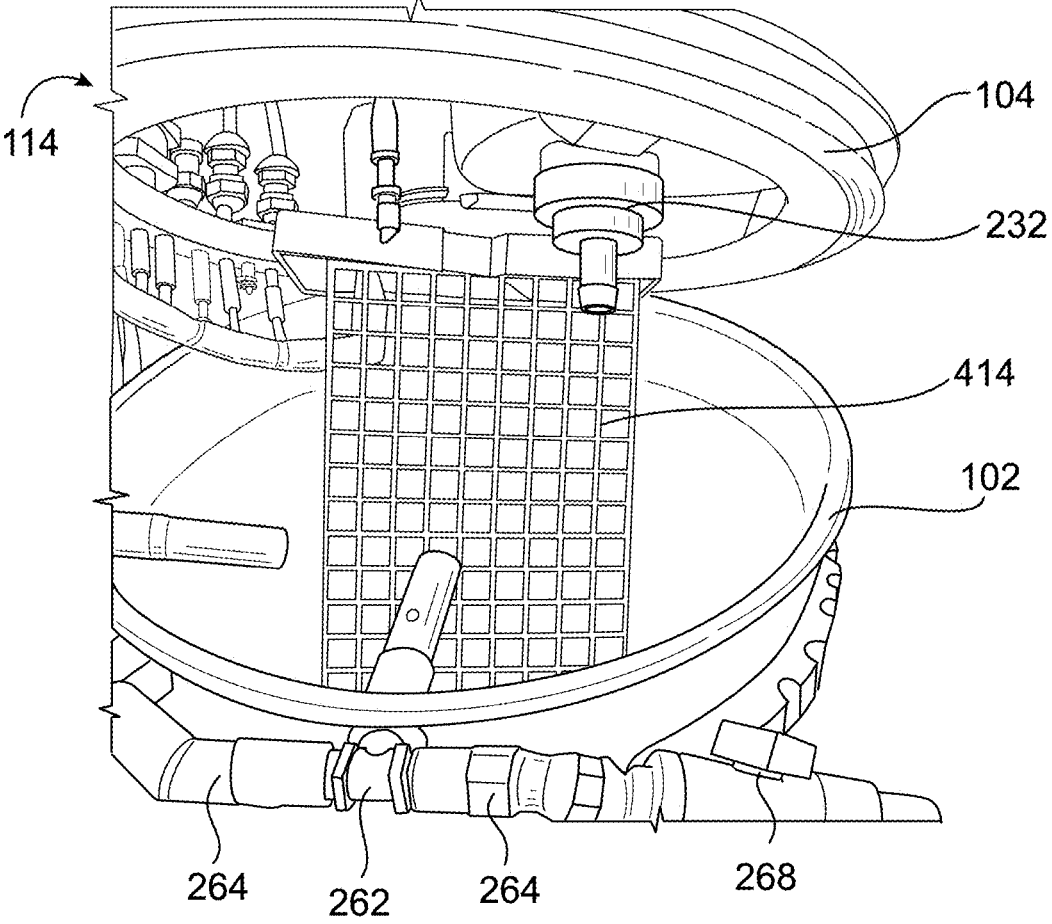
FIG. 2 is a bottom view of components of the NPD system of FIG. 1 showing a lid partially de-coupled from a reservoir, according to an exemplary embodiment.

As shown in FIGS. 1-2, the reservoir 102 is a container and is configured to receive (e.g., house, hold, store, etc.) a fluid and/or a nutrient from components of the NPD system 100 (e.g., the chamber 110, the measuring device 112, etc.). According to an exemplary embodiment, the reservoir 102 is substantially cylindrical, and is configured to receive 5 gallons (or 18.927 liters) of fluid (e.g., water, solvent, reverse osmosis water, etc.). The reservoir 102 may include a fill line (e.g., at an interior portion of the reservoir 102, at an exterior portion of the reservoir 102, etc.), which may indicate an appropriate amount (e.g., maximum, preferred, predetermined, etc.) of fluid to be received by the reservoir 102. In some embodiments, the reservoir 102 receives the fluid and the nutrient from the same, or different, components of the NPD system 100 (e.g., the chamber 110, the measuring device 112, etc.), simultaneously, in series, at predetermined times, and/or at any other suitable time interval. In some embodiments, the reservoir 102 is configured to receive a fluid having predetermined characteristics (e.g., a pre-adjusted pH level based on known nutrients that will be added to the fluid, etc.). In some embodiments, the reservoir 102 is another suitable shape (e.g., a cube, rectangular prism, ovate, elliptical, etc.), and/or is configured to receive another suitable amount of fluid and/or nutrient (e.g., 1, 2.5, 10, 15, 25, 50, 55, 100, etc. gallons). The reservoir 102 may be formed of any suitable material (e.g., plastic, metal, a combination thereof, etc.), and/or may be configured to interact with a cleaning solution (e.g., sanitizing solution, chlorine, bleach, etc.). In some embodiments, the NPD system 100 includes one or more reservoirs 102 (e.g., 1, 2, 5, 10, etc.), which may be in fluid communication with other components of the NPD system 100 (e.g., another reservoir 102, etc.). For example, the NPD system 100 may include a first reservoir 102 positioned proximate to (e.g., on top of, aside, etc.) a second reservoir 102, where the first reservoir 102 configured to receive a fluid and/or a nutrient from components of the NPD system 100 (e.g., the second reservoir 102), and/or provide the fluid and/or nutrient to the second reservoir 102 (e.g., via gravity, a pump, etc.). In this regard, the NPD system 100 may include one or more reservoirs 102 (e.g., a first reservoir, a second reservoir, etc.) configured to move (e.g., circulate, pump, etc.) a fluid and/or a nutrient through components of the NPD system 100.

The lid 104 may be coupled to a top portion of the reservoir 102, and may be configured to form a liquid-tight seal between components of the NPD system 100 (e.g., the reservoir 102, the lid 104, the mixer 106, the chamber 110, the measuring device 112, etc.). In an exemplary embodiment, the lid 104 is further configured to couple to components of the NPD system 100, so as to support and/or integrate components of the NPD system 100. For example, the lid 104 may be coupled to the mixer 106, the chamber 110, the measuring device 112, and/or the delivery manifold 114 (e.g., as shown in at least FIG. 1), so as to position/orient components of the NPD system 100 relative to the lid 104, the reservoir 102, etc., and/or integrate the components of the NPD system 100 as a uniform system. As shown in FIGS. 1-2, the lid 104 is substantially circular so as to adequately couple to a top portion of the reservoir 102; however, in some embodiments, the lid 104 is another suitable shape (e.g., substantially square, rectangular, oval, elliptical, etc.), size, and/or configuration (e.g., formed of plastic, metal, etc., includes seals, gaskets, etc., and/or any combination thereof). In some embodiments, the NPD system 100 does not include the lid 104. In this regard, the chamber 110, the measuring device 112, and/or the delivery manifold 114 may be coupled to the reservoir 102 (e.g., an edge, rim, interior wall, exterior wall, etc.), such that the reservoir 102 supports and/or integrates components of the NPD system 100 as a uniform system.

As shown in at least FIG. 1, the mixer 106 is coupled to the lid 104, and is configured to be manipulated so as to selectively mix (e.g., amalgamate, aerate, move, stir, etc.) the fluid and/or nutrient within the reservoir 102. As will be discussed in greater detail below (e.g., see FIGS. 6-9), the mixer 106 may be a spring-loaded paddle, and may include components that are configured to mix the fluid and/or the nutrient to form a nutrient solution within the reservoir 102.

For example, the mixer 106 may include a base coupled to the lid 104, and a grated paddle coupled to the base and positioned within the reservoir 102. The mixer 106 may also include other components, for example a handle, housing, spring, rod, protective sleeve, textured interface, etc., and may be manipulated so as to reposition the paddle within the reservoir 102 to mix the fluid and/or nutrient within the reservoir 102. In some embodiments, the mixer 106 is another suitable mixing device (e.g., beater, whisk, paddle, pump, etc.) configured to mix the fluid and/or nutrient within the reservoir 102. In some embodiments, the mixer 106 is integrated and/or otherwise configured within the NPD system 100. In this regard, the mixer 106 may be configured to be manually manipulated free of the lid 104 (e.g. as a non-spring loaded paddle, etc.), and/or automatically manipulated (e.g., via an actuator, motor, etc.), so as to mix the fluid and/or the nutrient to form a nutrient solution within the reservoir 102.

The pump 108 may be positioned within the reservoir 102, and may be configured to move a fluid, nutrient, and/or a nutrient solution from the reservoir 102 to other components of the NPD system 100 (e.g., the chamber 110, the delivery manifold 114, tubing, etc.). As will be discussed in greater detail below with regard to FIGS. 2-5, the pump 108 may be a liquid transfer pump, and may be positioned at a bottom portion of the reservoir 102 so as to move fluid, nutrient, and/or a nutrient solution from a bottom portion of the reservoir 102 to other components of the NPD system 100. For example, the pump 108 may be configured to move a nutrient solution from a bottom portion of the reservoir 102 to the chamber 110 (e.g., for testing, etc.), the delivery manifold 114 (e.g., to be delivered to a plant or a vegetation, etc.), and/or another component of the NPD system 100. In some embodiments, the pump 108 is also configured to selectively mix (e.g., amalgamate, move, stir, etc.) the fluid and/or nutrient within the reservoir 102, so as to form a nutrient solution. In this regard, the pump 108 and/or the mixer 106 may be configured to suitably mix (e.g., amalgamate, aerate, move, etc.) the fluid and/or the nutrient to form a nutrient solution within the reservoir 102, and the pump 108 may be configured to move the nutrient solution to other components of the NPD system 100. In some embodiments, the NPD system 100 includes a plurality of pumps. For example, the NPD system 100 may include a pump 108 configured to recirculate nutrient solution to the reservoir 102 (e.g., for mixing, from another reservoir 102, etc.), a pump 108 configured to move nutrient solution to the measuring device 112 and/or measuring devices (e.g., for rinsing), a pump configured to move nutrient solution to the chamber 110 (e.g., for testing), and/or a pump 108 configured to move nutrient solution to the delivery manifold 114 (e.g., for delivery to a plant and/or vegetation). As discussed above, in some embodiments the NPD system 100 includes one or more reservoirs 102, which may include one or more pumps 108. For example, a first reservoir 102 may be configured to receive a fluid and/or a nutrient and provide the fluid and/or nutrient to a second reservoir 102 (e.g., via gravity, the pump 108, etc.), and a second reservoir 102 may be configured to selectively mix the fluid and/or nutrient (e.g., via the pump 108) and/or provide the fluid to components of the NPD system 100 (e.g., the first reservoir 102, the chamber 110, the delivery manifold 114, etc.). In some embodiments, the pump 108 is otherwise configured and/or positioned relative to components of the NPD system 100, for example, the pump 108 may be configured as an inline pump and/or may be positioned outside the reservoir 102.

As shown in at least FIG. 1, the chamber 110 is a container coupled to the lid 104, and is configured to receive a fluid and/or a nutrient solution (e.g., via the pump 108). According to an exemplary embodiment, the chamber 110 is a unified chamber (e.g., a unified body); however, in some embodiments the chamber 110 includes a plurality of chamber portions (e.g., an outer chamber, an inner chamber, a first chamber portion, a second chamber portion, etc.), which are in fluid communication with one another. In an exemplary embodiment, the chamber 110 is also configured to house (e.g., hold, support, include, etc.) a test kit. As will be discussed in greater detail below with regard to FIGS. 10-13, the chamber 110 may be configured to receive a nutrient solution from a bottom portion of the reservoir 102 (e.g., via the pump 108), and house a portion of the nutrient solution to interact with the test kit. In this regard, the test kit may interact with the nutrient solution to provide a test result (and/or a plurality of test results), for example a potential of Hydrogen (pH) reading, an electrical conductivity (EC) reading, a total dissolved solids (TDS) reading, a temperature of the nutrient solution, etc. of the nutrient solution. Given that the nutrient solution is provided from a bottom portion of the reservoir 102, the test results relating to the nutrient solution may be more accurate compared to traditional systems. Also in an exemplary embodiment, the chamber 110 includes additional components (e.g. an aperture, coupling, grommet, fitting, etc.), and the chamber 110 is further configured to provide (e.g., return, circulate, move, etc.) a portion of the nutrient solution to the reservoir 102 (e.g., for further mixing, amalgamating, recirculating, etc.). In some embodiments, the chamber 110 is integrated and/or otherwise configured relative to components of the NPD system 100. For example, the chamber 110 may be coupled to the reservoir 102 (e.g., an edge, rim, interior wall, exterior wall, etc.) and/or positioned so as to receive a fluid and/or a nutrient solution (e.g., via gravity from a first reservoir 102, via pressure from a second reservoir 102, via a pump of a first or second reservoir, etc.).

As shown in at least FIG. 1, the measuring device 112 is coupled to the lid 104, and is configured to receive a fluid and/or nutrient, and/or selectively provide the fluid and/or nutrient to the reservoir 102. As will be discussed in greater detail below with regard to FIGS. 3-4, the measuring device 112 may include components that are configured to receive a predetermined amount of fluid and/or nutrient (e.g., from a user, an external device, etc.), and selectively provide the fluid and/or nutrient to the reservoir 102 (e.g., for mixing, amalgamating, measuring, etc.). For example, the measuring device 112 may include a measuring base, a receiver, a grommet, a measuring valve, a measuring tube, a deliverer, a rinse device, etc., which may receive a nutrient and/or selectively provide the nutrient to the reservoir 102 (e.g., for mixing). In some embodiments, the NPD system 100 includes a plurality of measuring devices. For example, the NPD system 100 may include a first measuring device 112 configured to receive a first nutrient concentrate, a second measuring device 112 configured to receive a second nutrient concentrate, a third measuring device 112 configured to receive a third nutrient concentrate, etc. In this regard, the NPD system 100 may include a plurality of measuring devices 112 configured to provide (e.g., via a timer, sensor, etc.) a plurality of fluid and/or nutrients to the reservoir 102. In some embodiments, the measuring device 112 is another suitable measuring device, and/or includes components (e.g., a scale, sensor, timer, actuator, motor, etc.) that are configured to receive and/or provide a fluid and/or a nutrient to the reservoir 102. In some embodiments, the measuring device 112 is integrated and/or otherwise configured relative to components of the NPD system 100. For example, the measuring device 112 may be coupled to the reservoir 102 (e.g., an edge, rim, interior wall, exterior wall, etc. of a first reservoir 102, etc.) and/or positioned so as to receive a fluid and/or a nutrient, and/or selectively provide the fluid and/or nutrient to components of the NPD system 100 (e.g., to a first reservoir 102 to be housed, which may provide the fluid and/or nutrient to a second reservoir 102 for mixing, etc.).

As shown in at least FIG. 1, the delivery manifold 114 is coupled to the lid 104, and is configured to receive a fluid and/or nutrient solution from the reservoir 102 and/or provide the fluid and/or nutrient solution to other components of the NPD system 100. In an exemplary embodiment, the delivery manifold 114 is configured to receive a nutrient solution from the reservoir 102 (e.g., via the pump 108), and/or provide the nutrient solution to at least one plant. As will be discussed in greater detail below with regard to FIGS. 14-16, the delivery manifold 114 may include additional components, for example at least one port that is coupled to at least one nutrient tube (e.g., shown as nutrient tube 120). The nutrient tube 120 may be coupled to the delivery manifold 114 (e.g., a port, coupling, etc.) at a first end and at least one plant (e.g., shown as plant 122) at a second end, and may be configured to move the nutrient solution from the delivery manifold 114 to the plant 122. In some embodiments, the nutrient tube 120 is secured to a plant housing (e.g., shown as plant container 124) via a fastener (e.g., shown as stake 126), so as to provide the nutrient solution to a specific portion of the plant 122 (e.g., the root base, the root zones, the plant base, etc.). In some embodiments, the delivery manifold 114 includes additional, fewer, and/or different functional components, for example an adapter, couplers, valves, tubing, timers, sensors, etc. In some embodiments, the delivery manifold 114 is integrated and/or otherwise configured relative to components of the NPD system 100. For example, the delivery manifold 114 may be coupled to the reservoir 102 (e.g., an edge, rim, interior wall, exterior wall, etc.) and/or positioned so as to receive a fluid and/or a nutrient solution from the reservoir 102 (e.g., via gravity, pressure, etc.), and/or otherwise provide the fluid and/or nutrient solution to other components of the NPD system 100 (e.g., via gravity, pressure, etc.).

As an illustrative example, the components of the NPD system 100 of at least FIG. 1 may be configured to prepare, mix, balance, and/or deliver a nutrient solution to at least one plant and/or vegetation. For example, the reservoir 102 may receive a fluid (e.g., water, solvent, etc.), for example by removing the lid 104, via the measuring device 112, a fluid reservoir, etc. The appropriate amount of the fluid to be received may be indicated by a fill line of the reservoir 102, a recipe, a predetermined amount, and/or any other suitable measuring mechanism. In some embodiments, the lid 104 is then coupled to a top portion of the reservoir 102, so as to create a liquid-tight seal between components of the NPD system 100 (e.g., the lid 104, the reservoir 102, the mixer 106, the chamber 110, etc.), and/or integrate the components of the NPD system 100.

After the reservoir 102 receives the fluid, the measuring device 112 may receive a nutrient (e.g., a nutrient concentrate, etc.). The appropriate amount of the nutrient may be indicated by a measuring line, a recipe, a predetermined amount, and/or any other suitable measuring mechanism. According to an exemplary embodiment, after the measuring device 112 receives the nutrient, the measuring device 112 may provide the nutrient to the reservoir 102 (e.g., via a tube, drain, valve, etc.). In some embodiments, once the measuring device 112 provides the nutrient to the reservoir 102, components of the measuring device 112 are cleaned (e.g., via a rinse device, a rinse tube, water, sanitizing fluid, etc.), so as to remove excess nutrient from the measuring device 112, and provide a more accurate amount of nutrient to the reservoir 102. In some embodiments, the measuring device 112 may be configured to receive a plurality of nutrients (e.g., in series, at a predetermined time, etc.), and provide the plurality of nutrients to the reservoir 102 (e.g., for mixing, etc.).

Once the reservoir 102 receives the fluid and the nutrient, components of the NPD system 100 may mix (e.g., amalgamate, aerate, move, stir, etc.) the fluid and the nutrient to form a nutrient solution. For example, the mixer 106 may be manipulated, so as to selectively mix the fluid and the nutrient to form the nutrient solution. In an exemplary embodiment, the mixer 106 is a spring-loaded paddle, which includes a paddle that is configured to be manipulated (e.g., vertically reposition up/down) so as to adequately mix (e.g., amalgamate, aerate, etc.) the fluid and the nutrient. In some embodiments, the pump 108 is also activated (e.g., powered, driven, turned on, etc.), so as to selectively mix the fluid and the nutrient to form the nutrient solution.

After the fluid and the nutrient are mixed, the pump 108 may move the nutrient solution from the reservoir 102 to other components of the NPD system 100. For example, the pump 108 may be positioned at a bottom portion of the reservoir 102, and may be configured to move the nutrient solution from a bottom portion of the reservoir 102 to the chamber 110 (e.g., through a bottom draw fitting on the pump, etc.). The chamber 110 may include a test kit that is configured to interact with the nutrient solution, so as to provide a test result (and/or a plurality of test results) relating to the nutrient solution (e.g., a single, dynamic, continuous, etc. pH reading, an EC reading, a TDS reading, a temperature, etc. of the nutrient solution). In some embodiments, the chamber 110 is also configured to provide (e.g., return, circulate, etc.) the nutrient solution to the reservoir 102 (e.g., via an aperture, coupling, fitting, etc. in the chamber 110, etc.), for example to further mix the nutrient solution, recirculate the nutrient solution to the chamber 110, and/or permit for additional testing relating to the nutrient solution.

Once the test results of the nutrient solution provide an appropriate result (e.g., preferred, suitable, within a predetermined range, etc. for pH reading, EC reading, TDS reading, temperature, etc.), the pump 108 may move the nutrient solution to the delivery manifold 114. In this regard, the pump 108 may be de-coupled (e.g., disconnected, etc.) from the chamber 110, and coupled (e.g., connected, etc.) to the delivery manifold 114. As discussed above, in some embodiments the NPD system 100 includes a plurality of pumps, and another pump 108 (e.g., similar to the pump 108) is coupled to the delivery manifold 114 and/or configured to move the nutrient solution to the delivery manifold 114. The delivery manifold 114 may then receive the nutrient solution from the pump 108, and provide the nutrient solution to at least one plant or vegetation. For example, the delivery manifold 114 may be coupled to at least one tube (e.g., nutrient tube 120), which is coupled to the delivery manifold 114 at a first end and at least one plant (e.g., plant 122) at a second end. In this regard, the nutrient tube 120 may be configured to facilitate movement of the nutrient solution from the delivery manifold 114 to the at least one plant 122. As such, the components of the NPD system 100 may be configured to accurately prepare, mix, balance, and/or deliver a nutrient solution to at least one plant and/or vegetation. The components of the NPD system 100 are described in further detail below.

Figure 3:
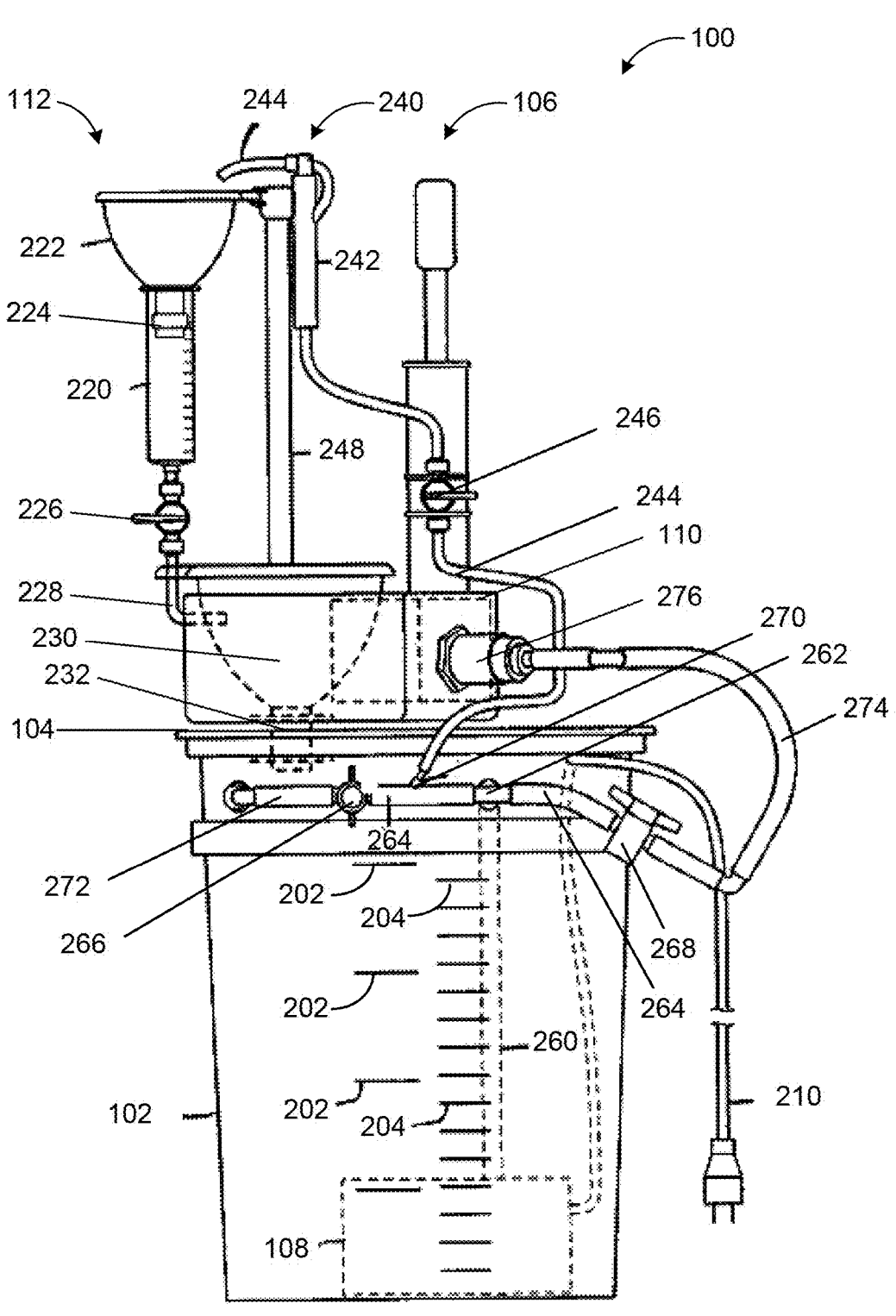
FIG. 3 is a cross-sectional side view of the NPD system of FIG. 1, according to an exemplary embodiment.
Figure 4:
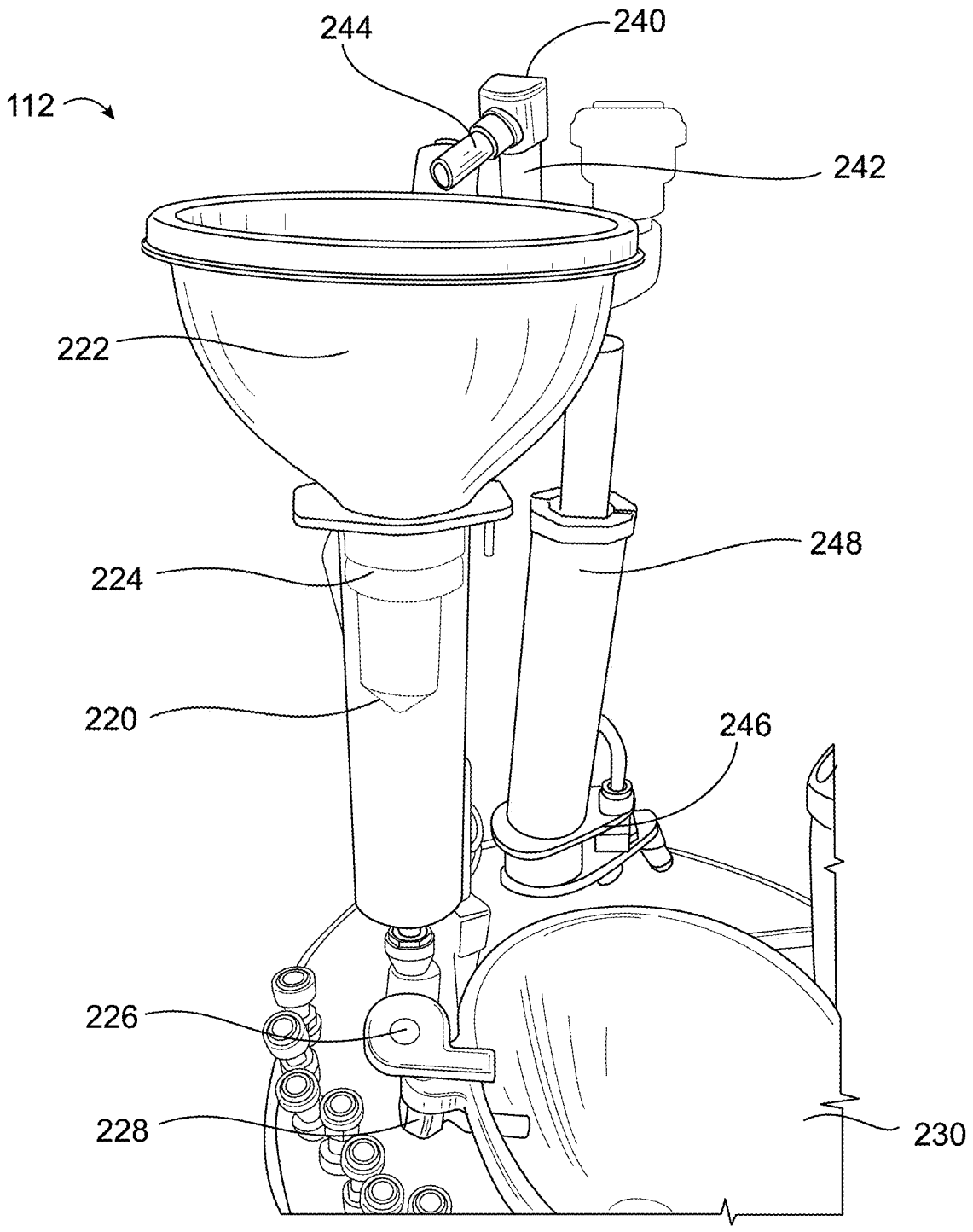
FIG. 4 is a side view of components of the NPD system of FIG. 1 showing a measuring device, according to an exemplary embodiment.

Referring now to FIGS. 2-4, views of a nutrient preparation and delivery system is shown, according to an exemplary embodiment. In an exemplary embodiment, the nutrient preparation and delivery system is the NPD system 100 of FIG. 1. As discussed above, the NPD system 100 includes the reservoir 102, the lid 104, the mixer 106, the pump 108, the chamber 110, the measuring device 112, and the delivery manifold 114. As shown in FIGS. 2-4, and as will be discussed in further detail below, the NPD system 100 also includes additional components that are configured to prepare, mix, balance, and/or deliver a nutrient solution.

As shown in FIG. 3, the reservoir 102 includes a plurality of fill lines. In an exemplary embodiment, the reservoir 102 includes first fill lines 202 (e.g., gallon fill lines, etc.) and second fill lines 204 (e.g., liter fill lines, etc.). The first fill lines 202 and/or the second fill lines 204 may be spaced so as to indicate incremental measurements, and may be positioned at any suitable location at the reservoir 102 (e.g., at an interior portion, an exterior portion, both an interior portion and an exterior portion, etc.). Further, the first fill lines 202 and/or the second fill lines 204 may be configured to indicate an appropriate amount (e.g., maximum, preferred, current amount, predetermined, etc.) of fluid and/or nutrient solution within the reservoir 102. In some embodiments, the reservoir 102 includes additional, fewer, and/or different components. For example, in some embodiments the reservoir 102 includes strengthening components (e.g., bars, beams, strengthening members, etc.) along the walls of the reservoir 102, along a base of the reservoir 102, etc., which are configured to increase the integrity of the reservoir 102.

In an exemplary embodiment, the pump 108 is a liquid transfer pump (e.g., electric water pump, etc.), and is positioned at a bottom portion of the reservoir 102 (e.g., as shown in at least FIG. 3). As discussed above, the pump 108 may be configured to move fluid and/or nutrient solution from a bottom portion of the reservoir 102 to other components of the NPD system 100 (e.g., the chamber 110, the delivery manifold 114, etc.). The pump 108 may have a suitable gallon-per-hour and/or gallon-per-minute rating (e.g., 25, 50, 150, 250, 350, 396, 400, 450, etc. gallon-per-hour rating, etc.), so as to provide enough power to move fluid and/or nutrient solution from the reservoir 102 to other components of the NPD system 100 (e.g., the chamber 110, the delivery manifold 114, a plant and/or vegetation, any combination thereof, etc.). According to an exemplary embodiment, the pump 108 is configured to move (e.g., deliver) the nutrient solution to a plant and/or vegetation at a consistent rate, as discussed herein. In some embodiments, the power requirements of the pump 108 may depend on other characteristics of components of the NPD system 100. For example, the characteristics of the pump 108 may depend on the size of the reservoir 102, the contents of the nutrient solution, the characteristics of tubing and/or valves of the NPD system 100 (e.g., open valves, closed valves, partially open valves, etc.), the characteristics of the delivery manifold 114 (e.g., 5, 8, 10, 15, 20 or more delivery ports, etc.), the characteristics of a plant and/or vegetation (e.g., based on the size of the container, stage of growth, intensity of light, canopy or leaf surface temperature, air circulation and/or movement, ambient air temperature, humidity, other environmental factors, etc.), and/or another suitable characteristics of the NPD system 100.

Also according to an exemplary embodiment, the pump 108 is configured to selectively mix (e.g., amalgamate, aerate, move, stir, circulate, etc.) the fluid and/or nutrient within the reservoir 102, so as to form a nutrient solution. In some embodiments, the pump 108 is another suitable pump (e.g., an in-line pump, a centrifugal pump, a plunger or piston pump, a circumferential-piston pump, a diaphragm and bellows pump, a gear pump, a lobed pump, a flexible-vane pump, a peristaltic pump, a non-submersible pump, etc.), and/or is positioned at another suitable location of the reservoir 102 (e.g., along a sidewall portion, at a middle portion, suspended within a fluid and/or nutrient solution, non-submersed in a fluid and/or nutrient solution, non-submersed in a fluid and/or nutrient solution and/or positioned outside the reservoir 102, etc.). In this regard, in some embodiments the pump 108 is configured to move/mix fluid and/or nutrient solution from/at another portion of the reservoir 102 (e.g., a sidewall, a middle portion, within a nutrient solution, outside a nutrient solution, etc.).

As shown in FIG. 3, the pump 108 also includes a power connector 210, which is configured to extend outside the reservoir 102 and activate/deactivate the pump 108. In an exemplary embodiment, the power connector 210 is coupled to the pump 108 at a first end, and is configured to selectively couple to a power source (e.g., an outlet, battery, generator, etc.) at a second end. In an exemplary embodiment, the power connector 210 includes an on/off switch, which is configured to activate/deactivate the pump 108. In this regard, when the power connector 210 is coupled to a power source, the power connector 210 may selectively activate/deactivate (e.g., power, drive, turn on, etc.) the pump 108 so as to move/stop fluid and/or nutrient solution flow from the reservoir 102. In some embodiments, the power connector 210 (and/or the pump 108) also includes a timer, sensor, electric pin, and/or another suitable actuating device, which allows the pump 108 (and/or the power connector 210) to be activated/deactivate at an appropriate (e.g., desired, predetermined, scheduled, etc.) time.

As shown in FIGS. 3-4, the measuring device 112 further includes a measuring base 220, a receiver (e.g., shown as funnel 222), a grommet 224, a measuring valve 226, and a measuring tube 228. According to an exemplary embodiment, the measuring base 220 is a container and is configured to receive (e.g., house, hold, etc.) a fluid (e.g., water, solvent, etc.) and/or a nutrient (e.g., a nutrient concentrate, etc.). In an exemplary embodiment, the measuring base 220 is substantially cylindrical, and is configured to receive any suitable amount of fluid and/or nutrient (e.g., 0.5 ml, 1 ml, 2 ml, 4 ml, 6 ml, 8 ml, 10 ml, 15 ml, 25 ml, 50 ml, 100 ml, etc.). The measuring base 220 may be formed of any suitable material (e.g., plastic, metal, etc.), and/or may be transparent or any suitable color. Further, the measuring base 220 may include measuring lines, which may indicate the appropriate (e.g., preferred, desired, predetermined, etc.) amount of the fluid and/or the nutrient to be received by the measuring device 112 (e.g., as shown in at least FIG. 4). In some embodiments, the measuring base 220 is another suitable shape (e.g., a cube, rectangular prism, etc.), size, and/or configuration.

The funnel 222 may be coupled to a top portion of the measuring base 220 (e.g., via the grommet 224, etc.), and may be configured to facilitate movement of fluid and/or nutrient to the measuring base 220. Although the funnel 222 is shown as a funnel in FIGS. 3-4, it should be understood that the funnel 222 may be any suitable receiving device configured to facilitate movement of fluid and/or nutrient to the measuring base 220 (e.g., a cup, plunger, syringe, etc.). The measuring valve 226 may be coupled to a bottom portion of the measuring base 220, and may be configured to control (e.g., permit, limit, restrict, prevent, etc.) movement of the fluid and/or nutrient from the measuring base 220 to other components of the NPD system 100. In an exemplary embodiment, the measuring valve 226 is an inline ball valve (e.g., with open/close configurations, etc.), and is configured to control movement of the fluid and/or nutrient from the measuring base 220 to the measuring tube 228. In some embodiments, the measuring valve 226 is another suitable valve (e.g., solenoid valve, globe valve, gate valve, plug valve, butterfly valve, etc.) configured to control movement of the fluid and/or nutrient. In yet some embodiments, the measuring valve 226 includes a timer, sensor, electric pin, on/off switch, and/or another suitable actuating device, which allows the measuring valve 226 to control movement of the fluid and/or nutrient at an appropriate (e.g., desired, predetermined, scheduled, etc.) time.

As shown in FIGS. 3-4, the measuring tube 228 is coupled to the measuring valve 226 at a first end, and is configured to facilitate movement of the fluid and/or the nutrient from the measuring device 112 to the reservoir 102. In some embodiments, the measuring device 112 further includes a deliverer 230. The deliverer 230 may be coupled to the measuring tube 228 and the lid 104, and may be configured to facilitate movement of the fluid and/or the nutrient from the measuring device 112 (e.g., the measuring tube 228) to the reservoir 102 (e.g., via an aperture 232, in the lid 104, the chamber 110, a combination thereof, etc.). Although the deliverer 230 is shown as a funnel in FIGS. 3-4, it should be understood that the deliverer 230 may be any suitable delivery device configured to facilitate movement of fluid and/or nutrient from the measuring device 112 to the reservoir 102. In some embodiments, the measuring device 112 does not include the deliverer 230; rather, the measuring tube 228 is coupled to the measuring valve 226 at a first end and the lid 104 at a second end. In this regard, the measuring tube 228 may be configured to facilitate movement of fluid and/or nutrient directly from the measuring device 112 (e.g., the measuring valve 226, the measuring base 220, etc.) to the reservoir 102 (e.g., via the aperture 232, in the lid 104, the chamber 110, a combination thereof, etc.).

According to the exemplary embodiment shown in FIGS. 3-4, the measuring device 112 also includes a rinse device 240. The rinse device 240 may include a rinse housing 242, a rinse tube 244, a rinse valve 246, and a support arm 248. According to an exemplary embodiment, the rinse device 240 is coupled to components of the NPD system 100 (e.g., the lid 104, the mixer 106, etc.), and is configured to clean (e.g., rinse, sanitize, etc.) other components of the measuring device 112 (e.g., the measuring base 220, the funnel 222, etc.) and/or the NPD system 100. For example, when undiluted nutrient concentrates combine (e.g., at the funnel 222, the measuring base 220, the measuring tube 228, etc.) the concentrates form precipitates. These precipitates may bind to components of the measuring device 112 (e.g., the measuring base 220, the funnel 222, etc.), bind to portions of the reservoir 102, become suspended in a nutrient solution, and/or become unavailable for uptake, etc. As such, the rinse device 240 may be configured to rinse components of the NPD system 100, so as to avoid precipitate formation, to prevent melding of concentrates and solution suspension, to avoid interactions that cause nutrient lock-out, to curtail nutrient solution formulation deficiencies, and/or any other issues associated with precipitate formation. In this regard, the rinse device 240 may be configured to rinse components of the NPD system 100 so as to permit more efficient and/or effective addition of nutrient concentrates (e.g., a single nutrient concentrate, sequential addition of several nutrient concentrates, etc.).

As shown in FIGS. 3-4, the rinse housing 242 is coupled to the rinse tube 244 and the support arm 248, and is configured to position/orient the rinse tube 244 relative to components of the NPD system 100. In an exemplary embodiment, the support arm 248 is an elongated structure that is coupled to the lid 104 at a first end and the rinse housing 242 at a second end (and/or the funnel 222, etc.), and is configured to position/orient the rinse housing 242 and/or the rinse tube 244. In this regard, the support arm 248 and/or the rinse housing 242 is/are configured to position/orient the rinse tube 244 at (e.g., adjacent to, above, coupled with, etc.) the funnel 222. As discussed above, in some embodiments, the support arm 248 coupled to another component of the NPD system 100, for example the reservoir 102 (e.g., an edge, rim, interior wall, exterior wall, etc.).

The rinse tube 244 may be of any suitable shape, size, and/or formed of any suitable material, and may be configured to facilitate movement of a fluid (e.g., water, cleaning solution, etc.) between components of the NPD system 100. As will be discussed in greater detail below, in an exemplary embodiment the rinse tube 244 is coupled to the rinse housing 242 at a first end, and other tubing of the NPD system 100 at a second end. In this regard, the rinse tube 244 may facilitate movement of a fluid (e.g., water, etc.) from the reservoir 102 (e.g., via other tubing) to the funnel 222, so as to remove (e.g., rinse, etc.) excess fluid and/or nutrient from the funnel 222 (and/or the measuring base 220, the measuring valve 226, the measuring tube 228, etc.). The rinse tube 244 may also be coupled to the mixer 106 (e.g., a mixer housing, etc.) and/or other components of the NPD system 100 at a middle portion, for example to position, orient, provide additional support to, etc. the rinse tube 244. In some embodiments, the rinse tube 244 is coupled to a cleaning device (e.g., a cleaning pouch, a cleaning reservoir, an exterior cleaning apparatus, etc.), and is configured to facilitate movement of a cleaning solution (e.g., water, cleaning solution, sanitizing fluid, etc.) from the cleaning device to the funnel 222, so as to remove excess fluid and/or nutrient from components of the measuring device 112 (e.g., to avoid precipitate formation, prevent melding of concentrates and solution suspension, to avoid interactions that cause nutrient lock-out, to curtail nutrient solution formulation deficiencies, etc.).

As shown in FIGS. 3-4, the rinse tube 244 is also coupled to the rinse valve 246, which is configured to control (e.g., permit, limit, restrict, prevent, etc.) movement of fluid within the rinse tube 244. In this regard, the rinse valve 246 may control movement of fluid (e.g., water, cleaning fluid, etc.) from the reservoir 102 (and/or a cleaning device) to components of the measuring device 112 (e.g., the funnel 222, the measuring base 220, etc.), so as to permit removal of excess fluid and/or nutrient from the measuring device 112. Similar to the measuring valve 226, in an exemplary embodiment the rinse valve 246 is an inline ball valve; however, in some embodiments the rinse valve 246 is another suitable valve (e.g., solenoid valve, etc.). Further, in some embodiments, the rinse valve 246 includes a timer, sensor, electric pin, on/off switch, and/or another suitable actuating device, to allow the rinse valve 246 to control movement of the fluid at an appropriate (e.g., desired, predetermined, scheduled, etc.) time.

Referring still to FIG. 3, the NPD system 100 also includes additional components that are configured to facilitate preparing, mixing, balancing, and/or delivering a nutrient solution. According to an exemplary embodiment, the pump 108 is coupled to tubing (e.g., shown as pump tube 260), which is configured to facilitate movement of fluid, nutrient, and/or nutrient solution from the reservoir 102 (e.g., via the pump 108) to other components of the NPD system 100. Similar to the tubing discussed above, the pump tube 260 may be of any suitable shape, size, and/or formed of any suitable material. As shown in FIG. 3, the pump tube 260 is coupled to the pump 108 at a first end and a junction (e.g., shown as junction 262) at a second end. In an exemplary embodiment, the junction 262 is a "tee" style fitting, and is configured to direct fluid and/or nutrient solution in a first direction and/or a second direction. In some embodiments, the junction 262 is another suitable fitting style (e.g., elbow, cross, wye, diverter tee, etc.), and/or is configured to direct fluid and/or nutrient solution in any suitable direction(s).

Figure 5:
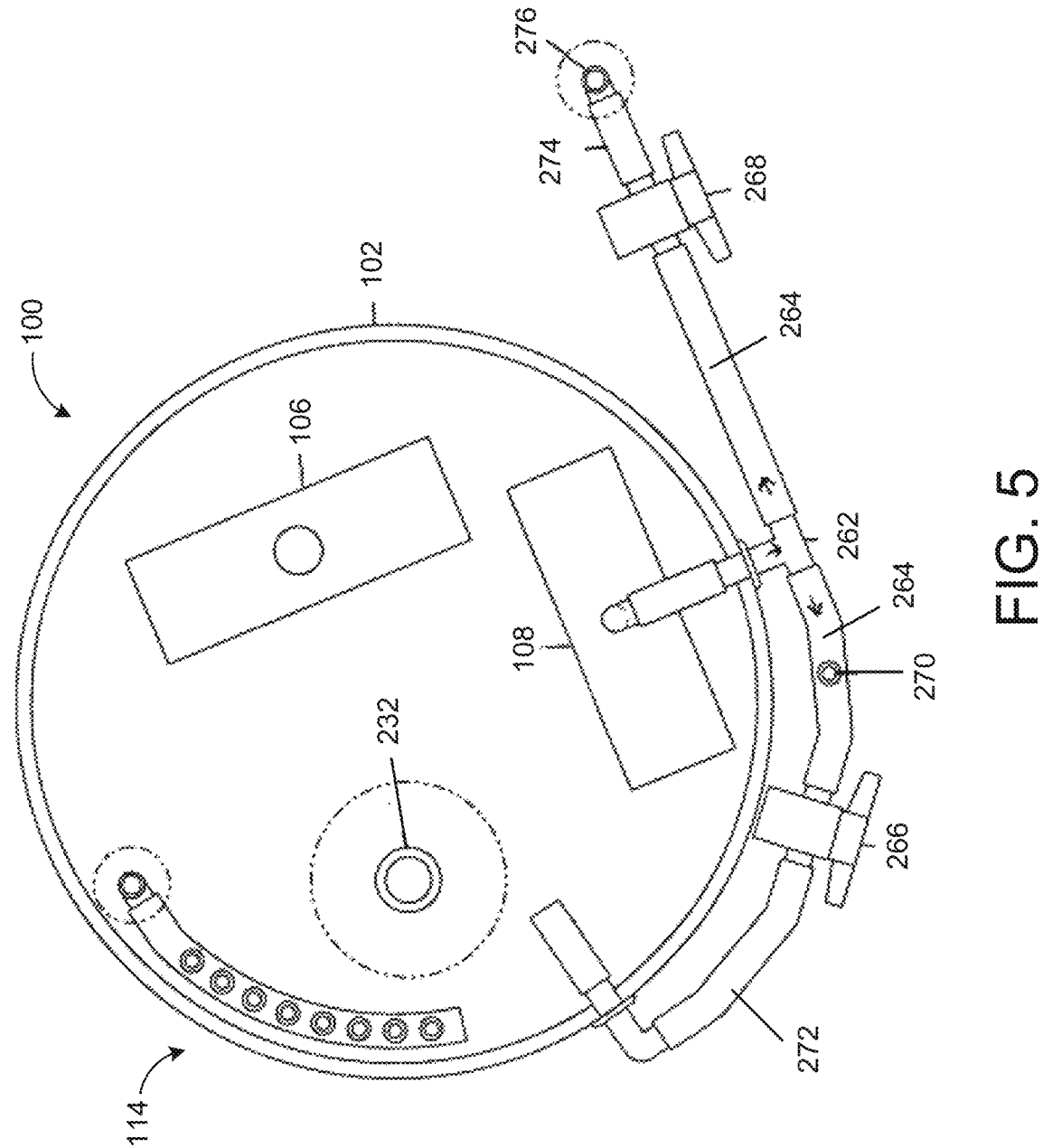
FIG. 5 is a cross-sectional top view of the NPD system of FIG. 1, according to an exemplary embodiment.

As shown in FIGS. 3-5, the junction 262 is coupled to tubing (e.g., shown as control tubing 264), which is configured to facilitate movement of fluid and/or nutrient solution from the junction 262 to other components of the NPD system 100. In an exemplary embodiment, the control tubing 264 includes a plurality of tubing sections. The plurality of tubing sections (e.g., of the control tubing 264) may be coupled to the junction 262 at first ends, and valves configured to control the movement of fluid and/or nutrient solution within the NPD system 100 at second ends. For example, a first section of the control tubing 264 may be coupled to the junction 262 at a first end and a reservoir valve 266 at a second end. In addition, a second section of the control tubing 264 may be coupled to the junction 262 at a first end, and a delivery valve 268 at a second end. Similar to the other valves discussed above, in an exemplary embodiment the reservoir valve 266 and/or the delivery valve 268 is/are inline ball valve(s); however, in some embodiments, the reservoir valve 266 and/or the delivery valve 268 is/are another suitable valve (e.g., solenoid valve, etc.). Moreover, like the other valves discussed above, the reservoir valve 266 and/or the delivery valve 268 may further include a timer, sensor, electric pin, on/off switch, and/or another suitable actuating device, to allow the valves to control movement of the fluid and/or nutrient solution at an appropriate time. According to an exemplary embodiment, the control tubing 264 is also coupled to the rinse tube 244 (e.g., via a tube piercing, junction, fitting, etc. shown as tube coupler 270). In this regard, the control tubing 264 may also permit movement of a fluid and/or nutrient solution from the reservoir 102 (e.g., via the pump 108, through the junction 262, etc.) to the rinse tube 244 (e.g., through the tube coupler 270) and/or other components of the rinse device 240.

As shown in FIGS. 3-5, the reservoir valve 266 is coupled to additional tubing (e.g., shown as reservoir tube 272) and the delivery valve 268 is also coupled to additional tubing (e.g., shown as delivery tube 274). Similar to the other tubing discussed above, the reservoir tube 272 and the delivery tube 274 may be of any suitable size, shape and/or material, and may be configured to facilitate movement of fluid and/or nutrient solution from the valves (e.g., the reservoir valve 266, the delivery valve 268, etc.) to other components of the NPD system 100. According to an exemplary embodiment, the reservoir tube 272 is coupled to the reservoir valve 266 at a first end, and the reservoir 102 at a second end. In this regard, the reservoir tube 272 may be configured to facilitate movement of fluid and/or nutrient solution from the reservoir valve 266 to the reservoir 102

(e.g., to return, circulate, mix, etc. fluid and/or nutrient solution to/in the reservoir 102, etc.).

As shown in FIGS. 3-5, the delivery tube 274 is coupled to the delivery valve 268 at a first end and a delivery adapter 276 at a second end. The delivery adapter 276 may be any suitable adapter (e.g., quick connect, male threaded, female threaded, union, etc.) configured to selectively couple/decouple the delivery tube 274 to the chamber 110, the delivery manifold 114, and/or another component of the NPD system 100. In this regard, the delivery tube 274 and the delivery adapter 276 may be configured to facilitate movement of fluid and/or nutrient solution from the delivery valve 268 to the chamber 110 (e.g., for testing, etc.), the delivery manifold 114 (e.g., for delivery to a plant and/or vegetation, etc.), and/or other components of the NPD system 100.

As an illustrative example, the components of the NPD system 100 of at least FIGS. 1-5 may be used to prepare and mix a nutrient solution. According to an exemplary embodiment, the reservoir 102 is configured to receive a fluid (e.g., water, solvent, a fluid having predetermined characteristics, for example pre-adjusted pH levels, etc.). For example, the reservoir 102 may receive a fluid by removing the lid 104 (e.g., as shown in at least FIG. 2), and the fluid may be added to the reservoir 102. Alternatively, or in addition, the measuring device 112 may receive the fluid (e.g., via the funnel 222, the measuring base 220, etc.), and the measuring device 112 may provide the fluid to the reservoir 102 (e.g., by manipulating the measuring valve 226 to an open configuration, via the measuring tube 228, the deliverer 230, etc.). In some embodiments, the reservoir 102 may receive the fluid via another suitable configuration (e.g., via an aperture in the lid 104, the chamber 110, an external fluid source, a fluid reservoir, etc.). An appropriate amount of fluid to be received by the reservoir 102 may be indicated by the first fill lines 202 and/or the second fill lines 204, and/or measuring lines on the measuring device 112 (e.g., the measuring base 220).

After the reservoir 102 receives the appropriate amount of fluid, the measuring device 112 may receive a nutrient. For example, the funnel 222 may receive the nutrient, and facilitate movement of the nutrient into the measuring base 220. The measuring valve 226 may be in a closed configuration, so as to prevent movement of the nutrient to other components of the NPD system 100 (e.g., the measuring tube 228, the reservoir 102, etc.). In this regard, the nutrient may be housed in the measuring base 220 until an appropriate (e.g., desired, preferred, predetermined, etc.) time. As discussed above, the appropriate amount of nutrient may be indicated by a measuring line on the measuring base 220.

Also, after the reservoir 102 receives the appropriate amount of fluid, the fluid may be moved (e.g., circulated, pumped, etc.) through components of the NPD system 100. The power connector 210 may be coupled to a power source, and the pump 108 may be activated (e.g., turned on, etc.). This may cause fluid at the bottom of the reservoir 102 to move (e.g., be pumped via the pump 108) through the pump tube 260 toward the junction 262. In an exemplary embodiment, the reservoir valve 266 is in an open configuration, and the other valves (e.g., the rinse valve 246, the delivery valve 268, etc.) are in a closed configuration. As the fluid moves through the pump tube 260 and/or the junction 262, the fluid moves into the control tubing 264, through the reservoir valve 266, and back into the reservoir 102. In an exemplary embodiment, the reservoir valve 266 may be configured (e.g., in an open configuration) so as to allow the fluid to recirculate from the pump 108 back to the reservoir

102 for additional mixing (e.g., through the pump tube 260, the junction, 262, the reservoir valve 266, the reservoir tube 272, etc.). According to an exemplary embodiment, the reservoir valve 266 is configured (e.g., in an open configuration) so as to permit fluid to flow through components of the NPD system 100 in order to reduce stress on components of the NPD system 100 (e.g., pressure buildup on tubes and/or fittings, pressure buildup in the pump 108, etc.). In this regard, the reservoir valve 266 may be configured (e.g., in an open configuration) so as reduce stress on components of the NPD system 100 (e.g., pressure buildup in the pump 108 when various valves are in a closed configuration, pressure buildup in the tubes and/or fittings when various valves are in a closed configuration, etc.) throughout the various processes described herein.

Once the measuring device 112 receives the appropriate amount of nutrient, and the fluid is moved through the components of the NPD system 100, the measuring device 112 may provide the nutrient to the reservoir 102. For example, the measuring valve 226 may be manipulated into an open configuration (e.g., manually, automatically, etc.), causing the nutrient to pass from the measuring base 220 (i.e., through the measuring valve 226), through the measuring tube 228, and to the reservoir 102 (e.g., via the aperture 232). In some embodiments, the nutrient passes from the measuring base 220, through the measuring tube 228, and through the deliverer 230 to the reservoir 102 (e.g., via the aperture 232).

According to an exemplary embodiment, once the nutrient is provided to the reservoir 102, the measuring device 112 may be rinsed (e.g., cleaned), so as to remove any excess nutrient from the components of the measuring device 112 and provide a more precise nutrient delivery (e.g., to avoid precipitate formation, prevent melding of concentrates and solution suspension, to avoid interactions that cause nutrient lock-out, etc.). For example, after the nutrient is provided to the reservoir 102, the rinse valve 246 may be manipulated into an open configuration (e.g., manually, automatically, etc.). This may cause the fluid in the control tubing 264 and/or the rinse tube 244 to move (e.g., via the pump 108) toward an end of the rinse tube 244. As the fluid leaves the end of the rinse tube 244, the fluid may enter components of the measuring device 112 (e.g., the funnel 222, the measuring base 220, etc.). The measuring valve 226 may remain in an open configuration, so as to permit the fluid from the rinse tube 244 to move through components of the measuring device 112 (e.g., the measuring base 220, the measuring tube 228, etc.), and back to the reservoir 102. In this regard, as the fluid moves through the measuring device 112, the fluid may remove any excess nutrient that remains in the measuring device 112 (e.g., for a more precise nutrient amount in the reservoir 102, to avoid precipitate formation, etc.). In some embodiments, the reservoir valve 266 is manipulated (e.g., to a partially open configuration, a partially closed configuration, etc.), so as to increase the fluid flow (e.g., via increased pressure, etc.) to the rinse tube 244 and/or the measuring device 112 for more effective rinsing. According to an exemplary embodiment, once all excess nutrient is removed from the measuring device 112 (e.g., rinsed and/or provided to the reservoir 102, etc.), the rinse valve 246 may be manipulated into a closed configuration (e.g., with the reservoir valve 266 in an open configuration), such that the fluid and the nutrient concentrates may be mixed, as discussed herein. Similarly, the measuring valve 226 may also be manipulated into a closed configuration (e.g., manually, automatically, etc.), for example in preparation for receiving another and/or additional fluid and/or nutrient at the measuring device 112 (e.g., for addition of another nutrient).

After the reservoir 102 receives the fluid and the nutrient, components of the NPD system 100 may mix (e.g., amalgamate, aerate, move, stir, etc.) the fluid and the nutrient to form a nutrient solution. According to an exemplary embodiment, the mixer 106 is manipulated to mix the fluid and the nutrient to form the nutrient solution, as discussed in further detail with regard to FIGS. 6-9. In some embodiments, the pump 108 is activated and components of the NPD system 100 are manipulated to mix the fluid and the nutrient to form the nutrient solution. For example, after the fluid and the nutrient are provided to the reservoir 102, the reservoir valve 266 may be in an open configuration, with the rinse valve 246, the delivery valve 268, etc. manipulated into a closed configuration. In addition, after the fluid and the nutrient are provided (and the pump 108 is activated), the pump 108 may be configured to circulate the fluid and/or the nutrient within the reservoir 102. In this regard, as the pump 108 moves fluid/nutrient at the bottom of the reservoir 102 through the pump tube 260 toward the junction 262, the fluid/nutrient may move through the junction 262 to the control tubing 264, through the control tubing 264 to the reservoir valve 266, and through the reservoir valve 266 to the reservoir tube 272. The reservoir tube 272 may further move the fluid/nutrient to the reservoir 102 (e.g., via an aperture in the reservoir 102, etc.), so as to mix the fluid/nutrient in the reservoir 102, as discussed herein.

In some embodiments, the components of the NPD system 100 are configured to mix (e.g., amalgamate, aerate, move, stir, etc.) the fluid and the nutrient to form a nutrient solution, and/or rinse the measuring device 112 in sequence, simultaneously, and/or a combination thereof. For example, after the fluid and the nutrient are provided to the reservoir 102 (e.g., with the reservoir valve 266 in an open configuration), the pump 108 may move fluid from the bottom of the reservoir 102, through the pump tube 260, the junction 262, the control tubing 264, the reservoir valve 266, the reservoir tube 272, and back to the reservoir 102 for mixing (e.g., recirculating), as discussed above. Further, the rinse valve 246 may be manipulated (e.g., manually, automatically, etc.) into an open configuration and the measuring valve 226 may be manipulated into a closed configuration. In this regard, the pump 108 may move fluid from the bottom of the reservoir 102, through the rinse tube 244, and to components of the measuring device 112 (e.g., the funnel 222, the measuring base 220, etc.). With the measuring valve 226 in a closed configuration, the measuring device 112 (e.g., the funnel 222, the measuring base 220, etc.) may fill with fluid (e.g., so as to rinse components of the measuring device 112). Once the measuring device 112 is filled with fluid, the measuring valve 226 may be manipulated (e.g., manually, automatically, etc.) into an open configuration, so as to allow the fluid to flow back to the reservoir 102, as discussed above. In some embodiments, the measuring valve 226 is then manipulated back into a closed configuration, for example in preparation for addition of another nutrient concentrate. In this regard, components of the NPD system 100 may allow for measuring, mixing, and/or rinsing simultaneously, in sequence, and/or any combination thereof.

As will be discussed in further detail below with regard to FIGS. 10-16, once the fluid and the nutrient are mixed to form the nutrient solution, the nutrient solution may be moved (e.g., pumped, etc.) from the reservoir 102 to other components of the NPD system 100. For example, once the nutrient solution is mixed, the delivery valve 268 may be manipulated into an open configuration (e.g., manually, automatically, etc.). In this regard, as the pump 108 moves the nutrient solution at the bottom of the reservoir 102 through the pump tube 260 toward the junction 262, the nutrient solution may move through the junction 262, the control tubing 264, the delivery valve 268, the delivery tube 274, and to the delivery adapter 276. In an exemplary embodiment, and as discussed with regard to FIGS. 10-13, the delivery adapter 276 is coupled to the chamber 110, and the nutrient solution moves through the delivery adapter 276 and to the chamber 110 (e.g., for testing, balancing, etc.). In another exemplary embodiment, and as discussed with regard to FIGS. 14-16, the delivery adapter 276 is coupled to the delivery manifold 114, and a balanced nutrient solution moves through the delivery adapter 276 and to the delivery manifold 114 (e.g., for delivery to a plant, a vegetation, etc.).

Referring now to FIGS. 6-9, a mixer is shown, according to an exemplary embodiment. In an exemplary embodiment, the mixer is the mixer 106 of the NPD system 100 of FIGS. 1-5. As shown in at least FIGS. 6-9, the mixer 106 includes a support base (e.g., shown as rod 410), a manipulator (e.g., shown as handle 412), a mixing interface (e.g., shown as paddle 414), a base (e.g., shown as mixer housing 416), an actuator (e.g., shown as spring 418), and a protective layer (e.g., shown as sleeve 420). In some embodiments, the mixer 106 includes additional, fewer, and/or different working components, which are configured to mix (e.g., amalgamate, aerate, stir, move, etc.) fluid and/or nutrient within the reservoir 102.

Figure 6:
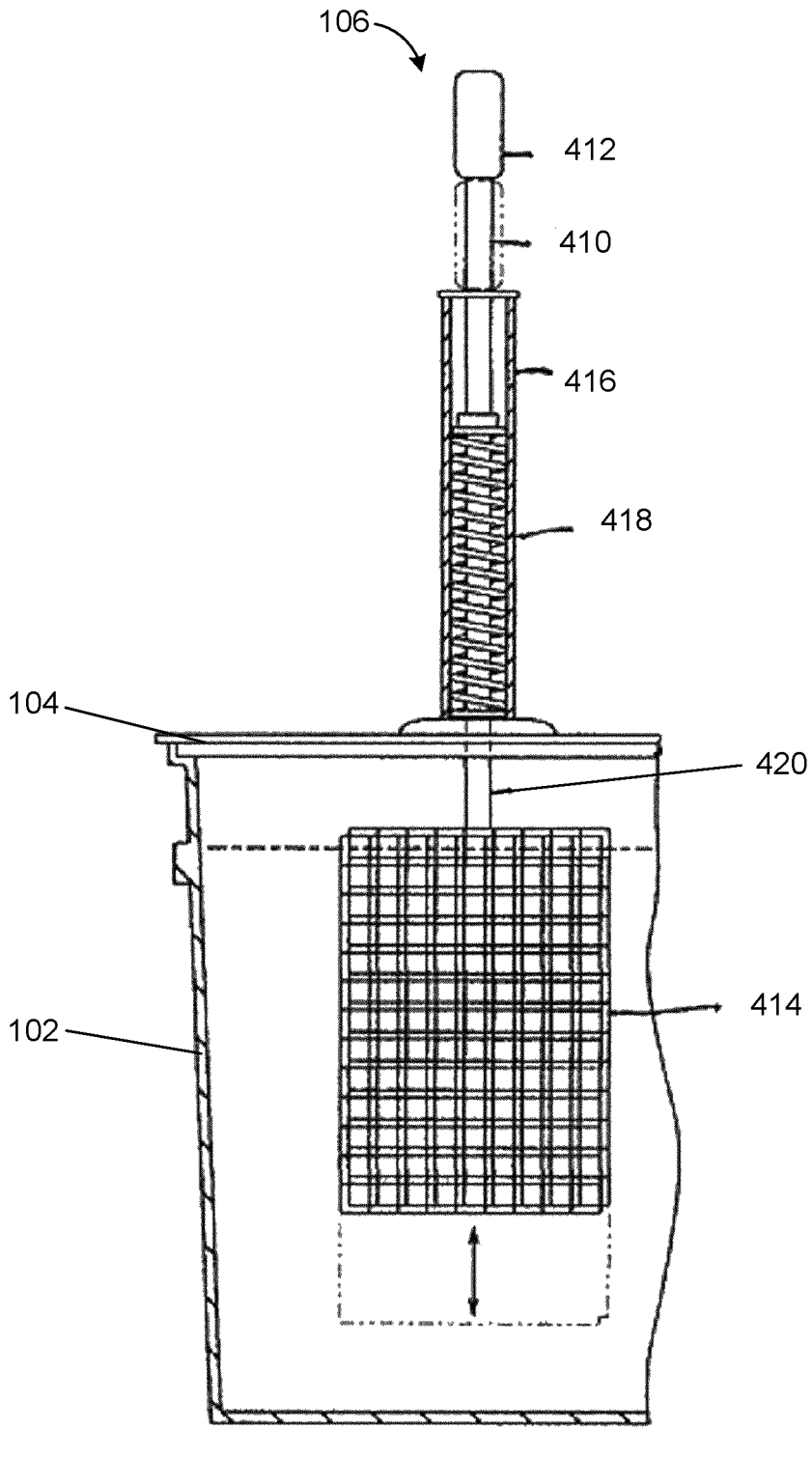
FIG. 6 is another cross-sectional side view the NPD system of FIG. 1 showing a mixer, according to an exemplary embodiment.
Figure 7:
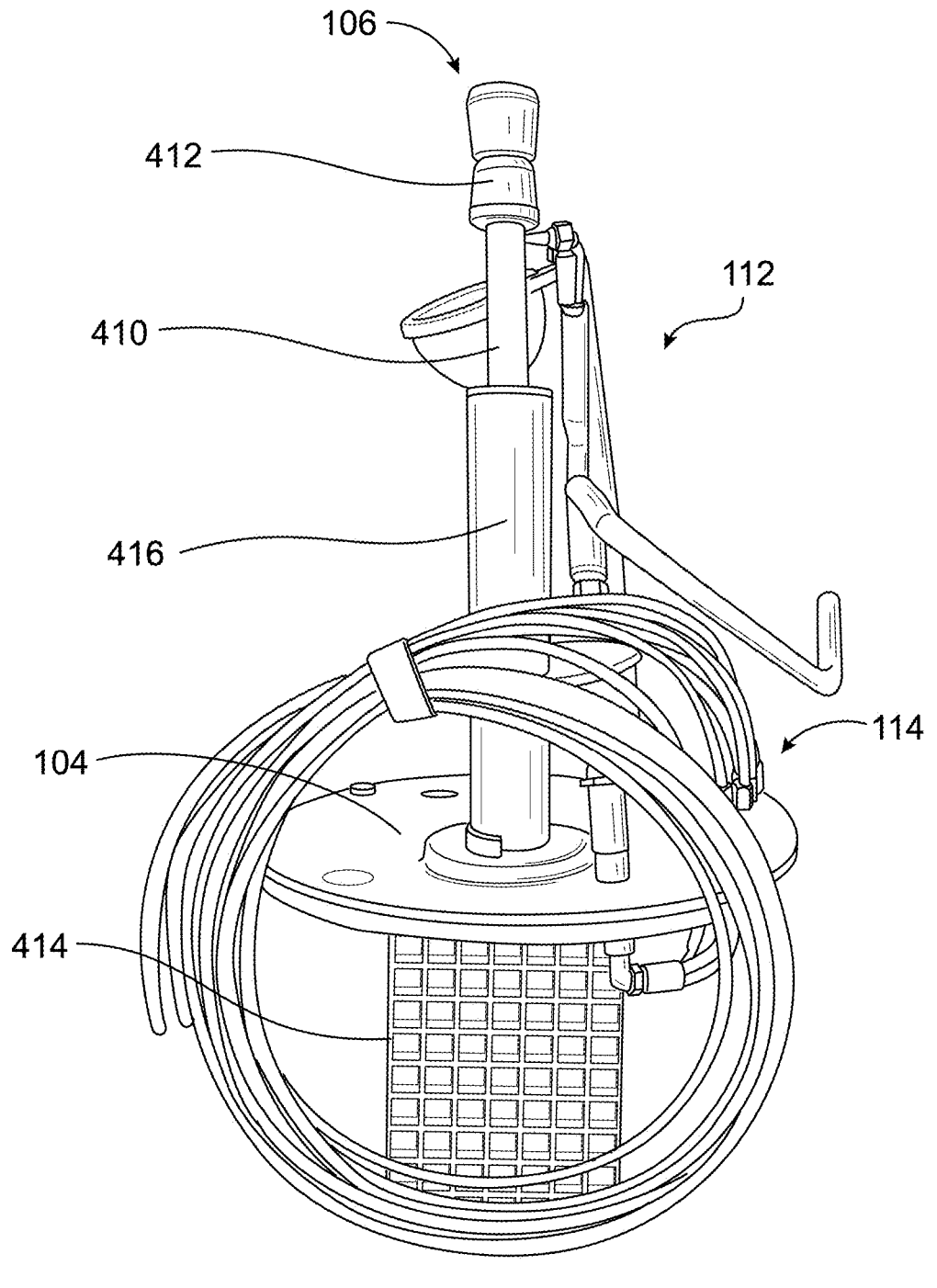
FIG. 7 is a side view of components of the NPD system of FIG. 1 showing a mixer, a measuring device, and a delivery manifold coupled to a lid, according to an exemplary embodiment.

As shown in FIGS. 6-7, the mixer 106 is coupled to the lid 104 and positioned within the reservoir 102, and is configured to be manipulated so as to selectively mix a fluid and/or a nutrient within the reservoir 102. According to an exemplary embodiment, the rod 410 is coupled to the handle 412 at a first end and the paddle 414 at a second end, and is configured to extend in a substantially vertical direction (i.e., through the lid 104 and) within the reservoir 102. In this regard, the rod 410 may be oriented so as to position the handle 412 outside the reservoir 102, and the paddle 414 within the reservoir 102. In an exemplary embodiment, the rod 410 is oriented/positioned such that at least a portion of the paddle 414 (e.g., a top portion, etc.) is exposed to air within the reservoir 102, as discussed below. The rod 410 may also be coupled to the mixer housing 416 (and the spring 418) at a middle portion, such that the mixer housing 416 (and the spring 418) is/are coupled to the lid 104 and/or positioned outside the reservoir 102. The rod 410 (and/or the mixer housing 416) may further be coupled to the lid 104 so as to form a seal between the mixer 106 and the lid 104, for example via the sleeve 420, a seal, a gasket, a coupler, and/or any other suitable coupling configuration. The seal may be a liquid-tight seal, an air-tight seal, a substantially liquid-tight seal, a substantially air-tight seal, and/or any other suitable type of seal. In some embodiments, the mixer 106 and the lid 104 are configured to substantially seal the reservoir 102 (e.g., seal the reservoir 102, seal the reservoir 102 except for a port in the reservoir 102 for introducing air into the reservoir 102, etc.). For example, the mixer 106 and the lid 104 may seal the reservoir 102 except for a port in the reservoir 102, which may be configured to allow introduction of air (e.g., via an air pump, an accordion foot pump, etc.) into the reservoir 102 so as to force (e.g., via buildup of pressure in the reservoir 102) the nutrient solution through components of the NPD system 100. According to an exemplary embodiment, the rod 410 a substantially cylindrical, elongated, uniform body; however, in some embodiments, the rod 410 is another suitable shape and/or size, and/or includes a plurality of rod components that may be coupled/de-coupled to form the rod 410.

Figure 8:
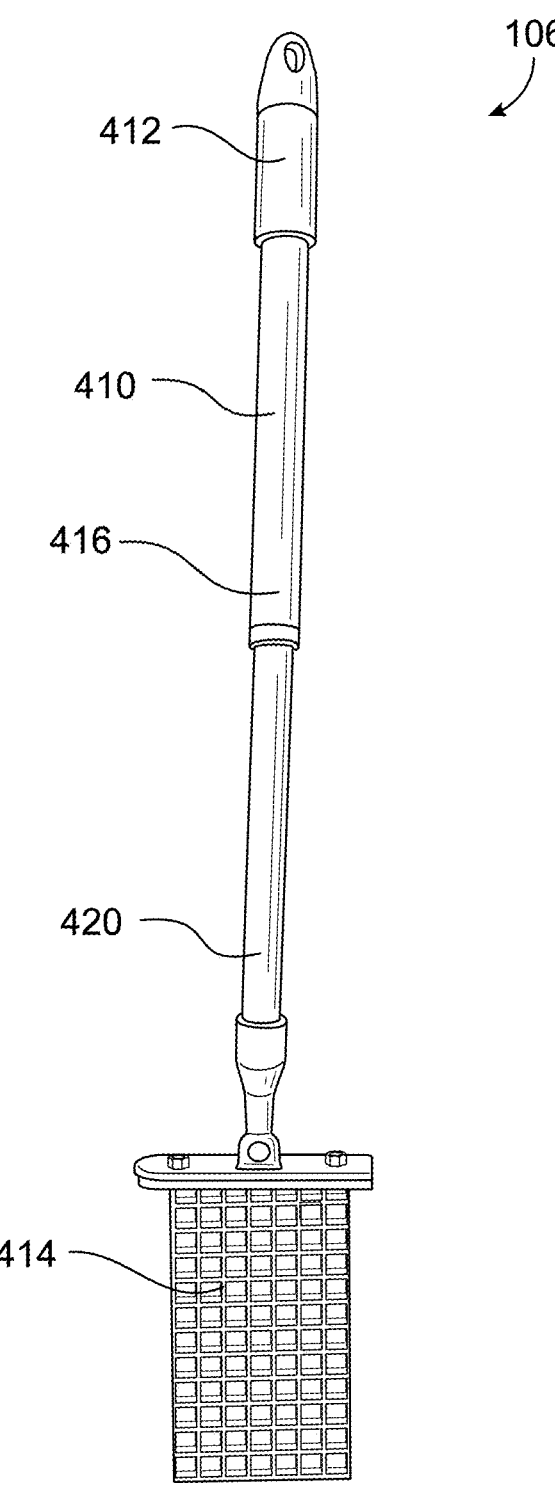
FIG. 8 is a side view of a mixer of the NPD system of FIG. 1, according to an exemplary embodiment.
Figure 9:
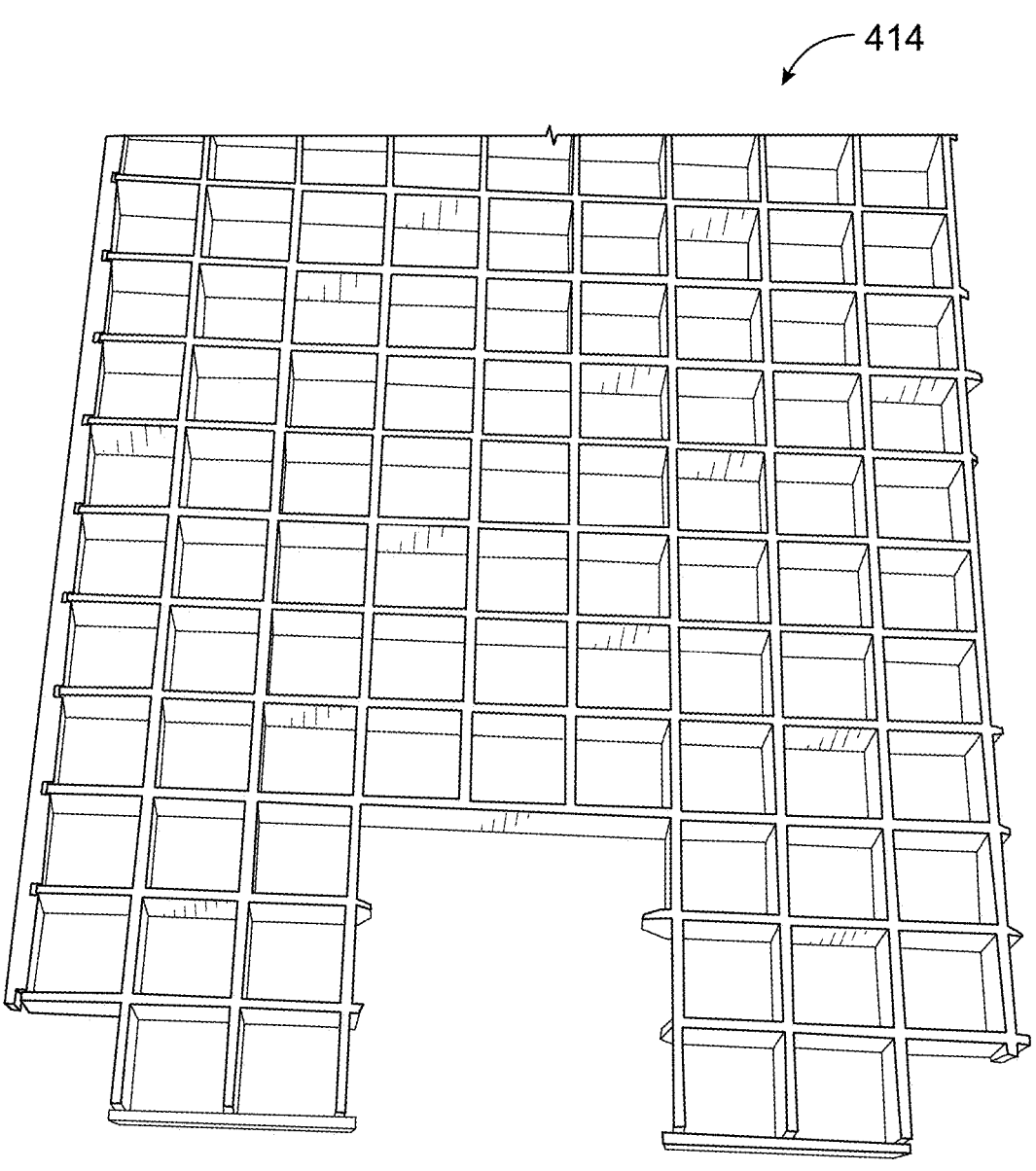
FIG. 9 is a side view of a mixing interface of a mixer of the NPD system of FIG. 1, according to an exemplary embodiment.

As shown in FIGS. 6-8, the handle 412 is coupled to an end of the rod 410 and is configured to be manipulated so as to selectively reposition components of the mixer 106 (e.g. the paddle 414). In an exemplary embodiment, the handle 412 is configured to be manipulated in a substantially vertical direction (e.g., up/down, etc.), so as to reposition the paddle 414 vertically relative to the lid 104 and/or the reservoir 102. The handle 412 may be formed of any suitable material (e.g., plastic, metal, etc.), and/or may be any suitable size. In an exemplary embodiment, the handle 412 is manipulated manually (e.g., via a user, etc.). In some embodiments, the handle 412 is manipulated automatically (e.g., via a driver, actuator, motor, gear driver, belt driver, timer, sensor, etc.), and/or is manipulated in another suitable direction (e.g., rotationally about a vertical axis, vertically and rotationally, at an angle, along a pendulum-like path, and/or any combination thereof, etc.).

As shown in FIGS. 6-8, the paddle 414 is coupled to another end of the rod 410, and is configured to be repositioned so as to selectively mix substances within the reservoir 102. In an exemplary embodiment, the paddle 414 is substantially rectangular, and is a suitable size so as to be positioned within the reservoir 102 such that at least a portion of the paddle 414 (e.g., a top portion, etc.) is exposed to air within the reservoir 102 (e.g., as shown in at least FIG. 6). For example, the paddle 414 may be approximately five inches wide (e.g., 4.5, 4.75, 5.25, 5.5, etc. inches) and approximately 8 inches in height (e.g., 7.5, 7.75, 8.25, 8.5, etc. inches). In some embodiments, the paddle 414 is another suitable width (e.g., 3, 4, 6, 7, 10, 20, 25, etc. inches), and/or height (e.g., 6, 7, 9, 10, 15, 25, 50, etc. inches). Further, the paddle 414 may include a textured interface (e.g., orifices, grated, grid, etc.), which may be configured to receive substances within the reservoir 102 (e.g., fluid, nutrient, air, etc.). For example, the paddle 414 may include rounded orifices that are half inch by half inch cavities in the paddle 414, which may form rows and columns in the paddle 414 (e.g., 15 rows, 9 columns etc.). In some embodiments, the paddle 414 includes orifices and/or other textured interfaces that are another suitable size (e.g., 0.25 inch by 0.25 inch, 0.75 inch by 0.75 inch, 1 inch by 1 inch, 2 inches by 2 inches, 10 inches by 10 inches, etc.), and/or form any number of suitable rows and/or columns in the paddle 414 (e.g., 1, 10, 25, 50, etc. rows, 1, 5, 10, 25, 50, etc. columns). According to an exemplary embodiment, the textured interface of the paddle 414 is configured to provide improved mixing qualities (e.g., increased aeration, less time, less effort, etc.) compared to traditional mixers, as will be discussed below. In an exemplary embodiment, the paddle 414 is formed of silicone; however, in some embodiments the paddle 414 is formed of a suitable plastic (e.g., a food safe plastic, etc.), metal, and/or another suitable composite material in addition or without silicone. In some embodiments, the paddle 414 is another suitable shape (e.g., square, circular, oval, etc.) and/or size, and/or includes another suitable textured interface (e.g., diamond, herringbone, stretcher bond, circular, etc.). In yet some embodiments, the paddle 414 is not a paddle; rather, is another suitable mixing interface (e.g., a beater, whisk, paddle, pump, rod, etc.) configured to form a nutrient solution.

According to an exemplary embodiment, the paddle 414 is configured to be actuated in a substantially vertical direction (e.g., up/down) to selectively mix substances within the reservoir 102. In this regard, as the paddle 414 is repositioned within the reservoir 102 (e.g., vertically up/down via manipulation of the handle 412), the textured interface of the paddle 414 may receive substances within the reservoir 102 (e.g., fluid, nutrient, air, etc.), resulting in mixing (e.g., amalgamating, aerating, etc.) of the substances to form a nutrient solution. As discussed above with regard to the handle 412, in some embodiments the paddle 414 is configured to be manipulated in another direction (e.g., side-to-side, rotated about an axis, repositioned diagonally, along a pendulum-like path, and/or any combination thereof, etc.), so as to selectively mix substances within the reservoir 102.

As shown in at least FIG. 6, the mixer housing 416 houses the spring 418, and is coupled to a middle portion of the rod 410 and a top surface of the lid 104. The mixer housing 416 may be formed of any suitable material (e.g., plastic, metal, etc.), and may be any suitable shape and/or size. In some embodiments, the mixer housing 416 is also coupled to other components of the NPD system 100, for example the rinse tube 244 and/or the rinse valve 246 (e.g., as shown in at least FIG. 3). As shown in FIG. 6, the spring 418 is housed within the mixer housing 416, and is coupled to a middle portion of the rod 410. The spring 418 may be a coil spring, a helical spring, compression spring, or any other suitable type of spring, and may be coupled to the rod 410 via any suitable coupling mechanism (e.g., via a bracket, grommet, washer, etc.). In an exemplary embodiment, the spring 418 is coaxial with the rod 410 and/or the mixer housing 416; however, in some embodiments, the spring 418 is not coaxial with the rod 410 and/or the mixer housing 416. According to an exemplary embodiment, the spring 418 is configured to selectively deform (e.g., compress/decompress, etc.), so as to reposition components of the mixer 106 (e.g., the paddle 414, etc.). In this regard, the spring 418 may deform (e.g., compresses) via manipulation of the handle 412, and/or return to an original orientation when the manipulation stops (e.g., decompresses), so as to selectively reposition the paddle 414 (e.g., up/down). In some embodiments, the spring 418 is configured to be automatically manipulated (e.g., via a driver, actuator, motor, press, etc.), manually manipulated (e.g., via a user, etc.), and/or is configured to be manipulated in any suitable direction (e.g., horizontally, at an angle, rotationally, etc.). In some embodiments, the spring 418 is not a spring; rather, is another suitable actuator configured to selectively reposition components of the mixer 106 (e.g., a damper, air bag, etc.).

As an illustrative example, the mixer 106 of FIGS. 6-9 may be configured to mix a nutrient solution for use in the NPD system 100 of FIGS. 1-5. For example, the reservoir 102 may receive an appropriate amount of fluid and nutrient (e.g., as discussed above with regard to FIGS. 2-5). Once the reservoir 102 receives the fluid and the nutrient (and the measuring device 112 is rinsed), the handle 412 may be manipulated (e.g., automatically, manually, etc.), for example in a substantially vertical direction (e.g., down). The manipulation of the handle 412 may cause the spring 418 to deform (e.g., compress), and the paddle 414 to be repositioned (e.g., down) within the reservoir 102. As the paddle 414 is repositioned, the portion of the textured interface of the paddle 414 that was exposed to air within the reservoir 102 (e.g., received air) may mix (e.g., aerate, etc.) the air with the fluid and/or the nutrient within the reservoir 102. Further, as the paddle 414 is repositioned, the textured interface may receive fluid and/or nutrient within the reservoir 102, resulting in further mixing (e.g., amalgamating, aerating, etc.). Once the handle 412 has been sufficiently manipulated (e.g., the spring 418 is fully compressed, the paddle 414 is at a bottom portion of the reservoir 102, etc.), the manipulation may be removed, and the spring 418 may return to an original orientation (e.g., decompress). As the spring 418 returns (e.g., decompresses), the paddle 414 may be repositioned (e.g., up) within the reservoir 102, causing the fluid and/or nutrient within the reservoir 102 to further mix (e.g., amalgamate, aerate, etc.). After the mixer 106 has returned to an original orientation, the handle 412 may again be manipulated, so as to repeat the process until the fluid and the nutrient are adequately mixed to form the nutrient solution.

As discussed above, an exemplary advantage of the mixer 106 of the present disclosure is that the mixer 106 (e.g., the mixing interface, the paddle 414) includes a grate or grid design, which is configured to facilitate aeration and mixing of nutrient and/or nutrient solution. For example, the mixer 106 (e.g., the paddle 414) advantageously allows a nutrient solution to be quickly agitated with a minimal amount of displacement (e.g., outside the reservoir 102). In an example embodiment, the paddle 414 comprises a series of interstices, orifices, cavities, or apertures, which provide space for liquid to occupy, which thereby limits displacement of fluid and/or reduces the risk of creating a wake that spills over the side of the container (e.g., the reservoir 102). In an exemplary embodiment, the paddle 414 of the present disclosure also advantageously provides a series of orifices or apertures that break up the contents of a fluid, rather than pushing the fluid around. In this regard, with every plunge of the paddle 414 into and out of the liquid (e.g., nutrient solution within the reservoir 102), a user introduces air to the fluid by breaking it up, thereby allowing air to be folded into the formulation.

Referring now to FIGS. 10-13, a portion of a nutrient preparation and delivery system is shown, according to an exemplary embodiment. In an exemplary embodiment, the nutrient preparation and delivery system is the NPD system 100 of FIGS. 1-9. As discussed above, the NPD system 100 includes the reservoir 102, the lid 104, the mixer 106, the pump 108, the chamber 110, the measuring device 112, and the delivery manifold 114. As shown in FIGS. 10-13, and as will be discussed in further detail below, the NPD system 100 also includes additional components that are configured to prepare, mix, balance, and/or deliver a nutrient solution.

As shown in FIGS. 10-13, the chamber 110 includes an input port (e.g., shown as chamber port 510), which is configured to connect (e.g., fluidly connect, etc.) the chamber 110 to other components of the NPD system 100. According to an exemplary embodiment, the chamber port 510 is configured to selectively couple/de-couple the chamber 110 to the delivery adapter 276 (i.e., and the delivery tube 274). In this regard, the chamber port 510 may be configured to facilitate movement of fluid and/or nutrient solution from the reservoir 102 (e.g., via the pump 108, through the delivery valve 268, the delivery adapter 276, etc.) to the chamber 110.

As shown in the exemplary embodiment of FIGS. 10-13, and as discussed briefly above, the chamber 110 includes a first chamber portion 110a and a second chamber portion 110b. As shown in at least FIGS. 10 and 13, the first chamber portion 110a houses (e.g., holds, contains, stores, etc.) a test kit, shown as a test pen 520 and a test meter 522. According to an exemplary embodiment, the first chamber portion 110a is configured to receive a fluid and/or a nutrient solution from a bottom portion of the reservoir 102 (e.g., via the pump 108, through the delivery valve 268, through the chamber port 510, etc.). Further, the first chamber portion 110a may house a first portion of the nutrient solution (e.g., a predetermined, minimum, maximum, preferred, etc.

amount), such that the test pen 520 and/or the test meter 522 may adequately interact with the nutrient solution to provide test results relating to the nutrient solution (e.g., a pH reading, EC reading, TDS reading, temperature, etc.). In this regard, the testing of the nutrient solution as described herein may provide more accurate test results compared to traditional systems (e.g., reduce the risk of the test pen 520 and/or the test meter 522 coming into contact with dirt, dust, debris, a precipitate formation, an undiluted concentrate, etc. at a top portion of the reservoir 102, provide an adequate and/or consistent amount of the nutrient solution in the first chamber portion 110a to be tested, etc.). Further, the testing of the nutrient solution as described herein may provide a more efficient process of providing test results, for example by reducing the risk of contamination and/or time needed to clean the test pen 520 and/or the test meter 522 between tests, after contamination, etc.

According to an exemplary embodiment, the test pen 520 and/or the test meter 522 is/are configured to provide (e.g., continuously, periodically, etc.) pH readings relating to the nutrient solution. For example, the test pen 520 and/or the test meter 522 may provide pH readings after the addition of a nutrient concentrate (e.g., a macro nutrient concentrate, a micro nutrient concentrate, etc.), after the addition of a pH buffer (e.g., potassium hydroxide, potassium carbonate, phosphoric acid, etc.), and/or any other addition and/or mixing of the nutrient solution. In this regard, the test pen 520 and/or the test meter 522 may be used to ensure that the total dissolved solids in a nutrient solution is within a suitable range, so as to ensure suitable uptake of the nutrient solution at the root zone of a plant and/or vegetation. In some embodiments, the test pen 520 and/or the test meter 522 automatically provide test result(s) relating to the nutrient solution (e.g., hands-free, via position/orientation of the test kit, the amount of the nutrient solution, a timer, a sensor, etc.), and/or provide test result(s) continuously, periodically, at a single time, and/or across/at any other suitable time period. In some embodiments, the test kit includes a single test pen 520 and/or test meter 522, a plurality of test pens 520 and/or test meters 522, and/or the test pen 520 and/or the test meter 522 are manually activated in order to provide test result(s).

As shown in FIGS. 10-13, the second chamber portion 110b is connected to the first chamber portion 110a, and is configured to house a portion of the nutrient solution and/or other components of the NPD system 100 (e.g., components of the measuring device 112, a funnel, etc.). According to an exemplary embodiment, the first chamber portion 110a and the second chamber portion 110b are in fluid communication (e.g., via a drain, outlet/inlet, tubing, aperture, etc.). In this regard, as the first chamber portion 110a receives the fluid and/or the nutrient solution from the reservoir 102 (e.g., via the pump 108, through the chamber port 510, etc.), and the first chamber portion 110a houses the nutrient solution for testing, the first chamber portion 110a may also move (e.g., provide, flow, etc.) a portion of the nutrient solution to the second chamber portion 110b. According to an exemplary embodiment, the second chamber portion 110b is configured to house (e.g., hold, store, contain, etc.) a portion of the nutrient solution from the reservoir 102. Further, in an exemplary embodiment, the second chamber portion 110b also includes an outlet (e.g., the aperture 232), which allows the nutrient solution in the second chamber portion 110b to selectively move (e.g., return, circulate, flow, etc.) from the second chamber portion 110b to the reservoir 102 (e.g., as shown in at least FIG. 10).

It should be understood that while FIGS. 10-13 illustrates the chamber 110 as having the first chamber portion 110*a* (e.g., housing the test kit), and the second chamber portion 110*b* (e.g., housing components of the measuring device 112), in some embodiments the first chamber portion 110*a* and the second chamber portion 110*b* are a unified chamber (e.g., the chamber 110). According to an exemplary embodiment, components of the NPD system 100 are configured to mix and/or balance a nutrient solution in sequence, simultaneously, and/or a combination thereof. For example, in an exemplary embodiment the reservoir valve 266 is in an open configuration, so as to allow the nutrient solution to recirculate through components of the NPD system 100 for mixing, as discussed above. In addition, the delivery valve 268 may be manipulated (e.g., manually, automatically, etc.) into an open configuration, so as to allow the nutrient solution to flow into the chamber 110 for testing, as discussed above. In some embodiments, the reservoir valve 266 is manipulated (e.g., to a partially open configuration, a partially closed configuration, etc.), so as to increase the fluid flow (e.g., via increased pressure, etc.) to the chamber 110 for more accurate testing. The configuration of the reservoir valve 266 (e.g., partially open/closed configuration, etc.) may depend on characteristics of components of the NPD system 100, for example the power output of the pump 108, as discussed above.

As an illustrative example, the components of the NPD system 100 of FIGS. 1-13 may be used to balance (e.g., measure) a nutrient solution. For example, the reservoir 102 may receive an appropriate amount of fluid and nutrient (e.g., as discussed above with regard to FIGS. 2-5). Once the reservoir 102 receives an appropriate amount of fluid and nutrient (and the measuring device 112 is rinsed), the mixer 106 and/or the pump 108 may be used to mix the fluid and nutrient to form a nutrient solution (e.g., as discussed above with regard to FIGS. 6-9). The nutrient solution may then be moved to other components of the NPD system 100, for example the chamber 110 for testing. As discussed briefly above, after the nutrient solution is mixed, the delivery adapter 276 may be coupled (e.g., remain coupled) to the chamber port 510. Further, the delivery valve 268 may be manipulated into an open configuration (e.g., with the reservoir valve 266 in an open configuration for recirculating the nutrient solution, with the reservoir valve 266 in a partially open configuration to increase the flow of the nutrient solution to the chamber 110, etc.). In this regard, as the pump 108 moves the nutrient solution at the bottom of the reservoir 102 through the pump tube 260, the junction 262, the control tubing 264, the delivery valve 268, the delivery tube 274, and the delivery adapter 276 (e.g., as discussed above with regard to FIGS. 2-5), the nutrient solution may move through the chamber port 510 and to the first chamber portion 110*a*.

The first chamber portion 110*a* may receive the nutrient solution, and may house a first portion of the nutrient solution. The first portion of the nutrient solution may interact with the test pen 520 and/or the test meter 522, and provide a test result relating to the nutrient solution. Further, the first chamber portion 110*a* may also move a second portion of the nutrient solution to the second chamber portion 110*b*. The second portion of the nutrient solution may be housed (e.g., stored) in the second chamber portion 110*b* and/or returned to the reservoir 102 (e.g., via the aperture 232). According to an exemplary embodiment, the first portion of the nutrient solution and the second portion of the nutrient solution may be mixed, the same, different, and/or any combination thereof. In this regard, as the nutrient solution moves from the pump 108, to the first chamber portion 110*a*, the second chamber portion 110*b*, the reservoir 102, then back to the pump 108, the components described herein may provide a flow of the nutrient solution within the NPD system 100, so as to provide for continuous, periodic, predetermined, etc. test results relating to the nutrient solution. Based on the nutrient solution test results, additional preparation and/or mixing may be completed. For example, additional nutrient may be added via the measuring device 112 (e.g., as discussed above with regard to FIGS. 2-5), and/or additional mixing may be completed via the mixer 106 (e.g., as discussed above with regard to FIGS. 6-9). In some embodiments, a pH buffer is added (e.g., a drop, a plurality of drops, 1 ml, 5 ml, etc.) to the nutrient solution in the reservoir 102. Once the additional preparation and/or mixing is/are complete, if necessary, the nutrient solution may again be moved to the first chamber portion 110*a* for subsequent testing. Any and/or all parts of the aforementioned process may be repeated until an appropriate (e.g., desired, preferred, within a predetermined range, etc.) nutrient solution is attained.

Figure 14:
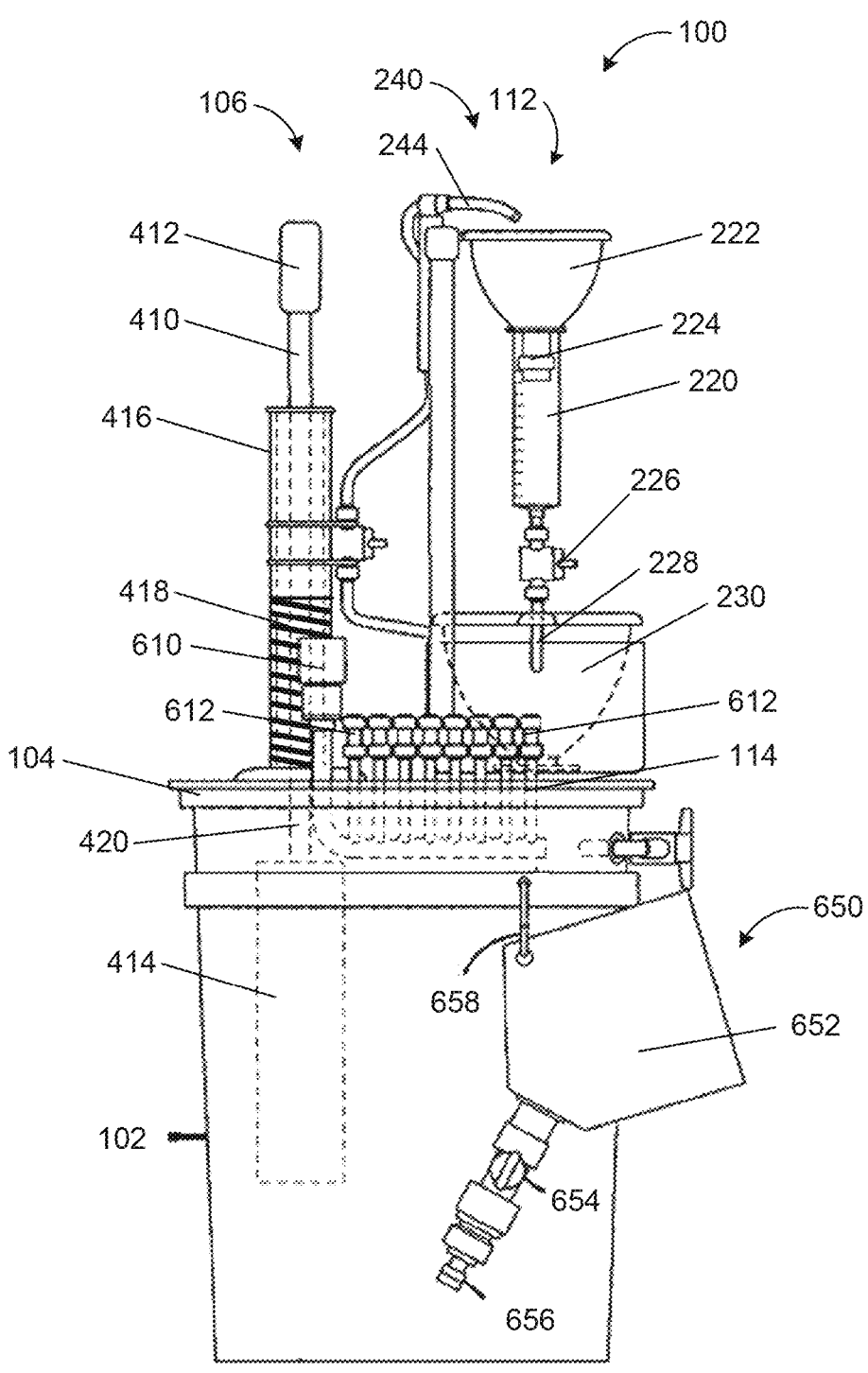
FIG. 14 is another cross-sectional side view of the NPD system of FIG. 1, according to an exemplary embodiment.
Figure 15:
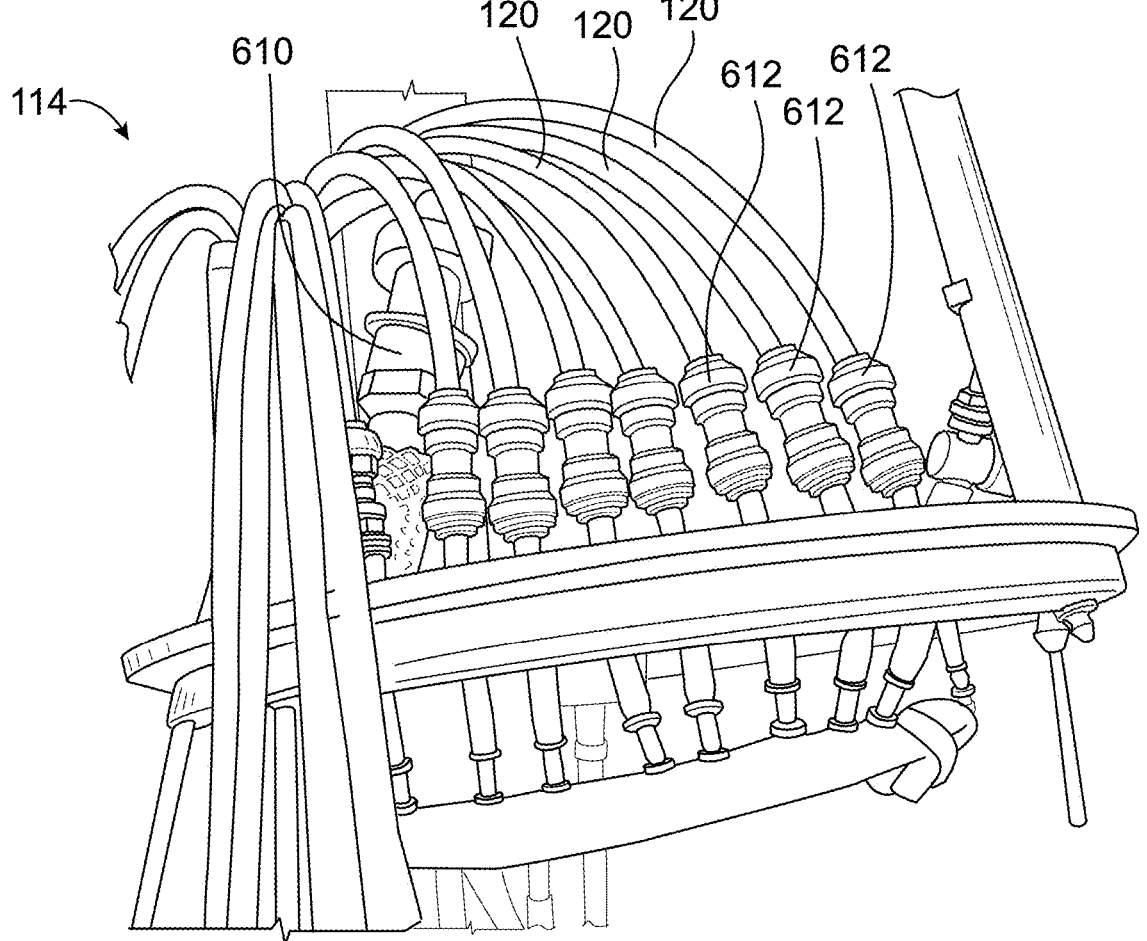
FIG. 15 is a side view of a delivery manifold of the NPD system of FIG. 1, according to an exemplary embodiment.
Figure 16:
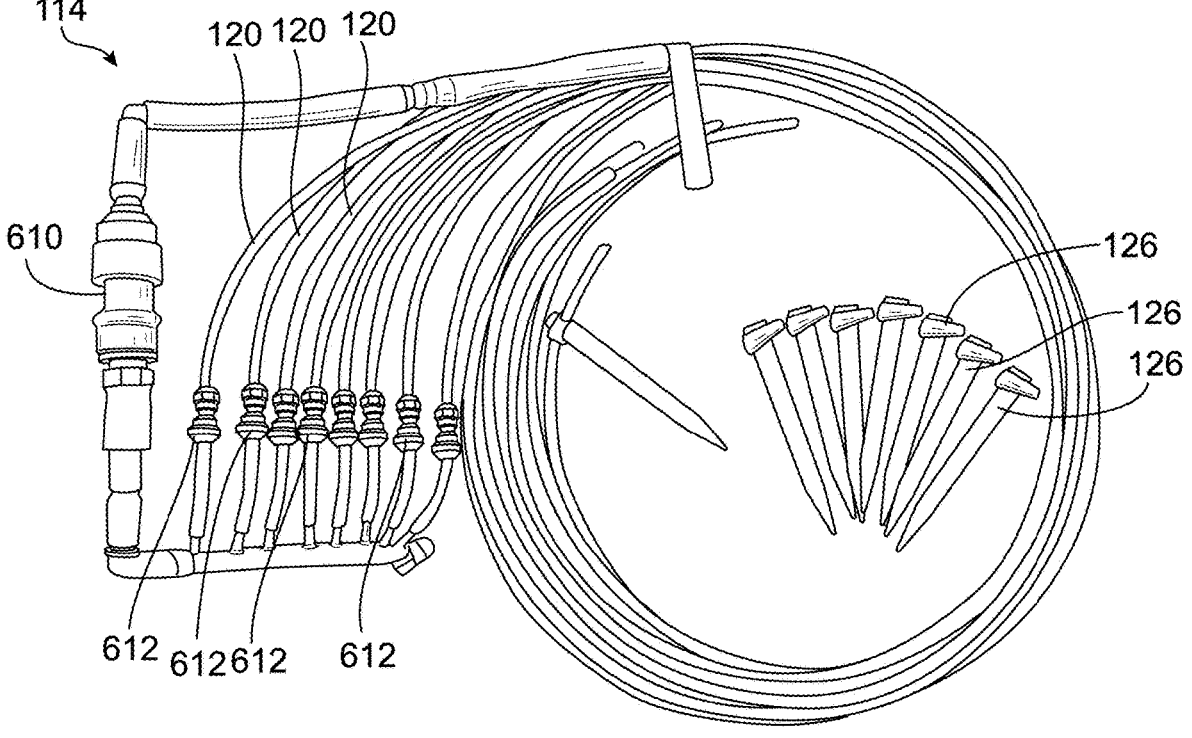
FIG. 16 is a top view of a delivery manifold coupled to a tube of the NPD system of FIG. 1, according to an exemplary embodiment.

Referring now to FIGS. 14-16, views of a nutrient preparation and delivery system is shown, according to an exemplary embodiment. In an exemplary embodiment, the nutrient preparation and delivery system is the NPD system 100 of FIGS. 1-13. As discussed above, the NPD system 100 includes the reservoir 102, the lid 104, the mixer 106, the pump 108, the chamber 110, the measuring device 112, and the delivery manifold 114. As shown in FIGS. 14-16, and as will be discussed in further detail below, the NPD system 100 also includes additional components that are configured to prepare, mix, balance, and/or deliver a nutrient solution.

As shown in FIGS. 14-16, the delivery manifold 114 includes an input port (e.g., shown as manifold port 610) and a plurality of output ports (e.g., shown as delivery ports 612). In an exemplary embodiment, the manifold port 610 is configured to connect (e.g., fluidly connect, etc.) the delivery manifold 114 to other components of the NPD system 100. For example, the manifold port 610 may be configured to selectively couple/de-couple the delivery manifold 114 to the delivery adapter 276 (i.e., and the delivery tube 274). In this regard, the manifold port 610 may be configured to facilitate movement of a fluid and/or balanced nutrient solution from the reservoir 102 (e.g., via the pump 108, through the delivery valve 268, the delivery adapter 276, etc.) to the delivery manifold 114. In some embodiments, the delivery manifold 114 includes additional, fewer, and/or different working components (e.g., closed loop, straight line caped end, T-style center-fed caped ends, valve vaped ends for an open-ended configuration, a barbed male end, an un-barbed male end, a tube piercing, a drip line, another suitable delivery line, etc.).

In an exemplary embodiment, the delivery ports 612 are configured to connect (e.g., fluidly connect, etc.) the delivery manifold 114 to tubing, so as to permit movement of fluid and/or balanced nutrient solution to a plant and/or a vegetation. According to an exemplary embodiment, the delivery ports 612 include couplings (e.g., quick connect couplers, male threaded, female threaded, union), and are configured to couple to the nutrient tubes 120. In this regard, the delivery ports 612 may be configured to facilitate movement of the fluid and/or balanced nutrient solution from the delivery manifold 114 to a plant and/or vegetation (e.g., via the nutrient tube 120). In some embodiments, the delivery ports 612 includes valves (e.g., inline ball valves, solenoid valve, globe valve, gate valve, plug valve, butterfly valve, etc.). In an exemplary embodiment, the delivery manifold 114 includes eight delivery ports 612; however, in some embodiments, the delivery manifold 114 includes any suitable number of delivery ports 612 (e.g., 1, 5, 10, 25, 100, etc.). In some embodiments, the delivery ports 612 include timers, sensors, electric pins, on/off switches, and/or other suitable actuating devices, which allow the delivery ports 612 (and/or the delivery manifold 114) to be activated/deactivated so as to selectively control the movement of fluid and/or balanced nutrient solution from the delivery manifold 114 to the nutrient tubes 120 (and the plants and/or vegetation).

According to an exemplary embodiment, components of the NPD system 100 are configured to mix and/or deliver a balanced nutrient solution to a plant and/or vegetation in sequence, simultaneously, and/or a combination thereof. For example, in an exemplary embodiment the reservoir valve 266 is in an open configuration, so as to allow the nutrient solution to recirculate through components of the NPD system 100 for mixing and/or to reduce stress on components of the NPD system 100, as discussed above. In addition, the delivery valve 268 may be manipulated into a closed configuration, for example to permit the delivery adapter 276 (i.e., and the delivery tube 274) to be coupled to the delivery manifold 114. Further, the delivery valve 268 may be in a closed configuration, so as to permit nutrient tubes 120 to be coupled to delivery ports 612 and/or the root zones of a plant and/or vegetation. In an exemplary embodiment, the delivery valve 268 may be manipulated into an open configuration, so as to allow the balanced nutrient solution to flow to the plant and/or vegetation (e.g., via the delivery manifold 114, the nutrient tubes 120, etc.). In some embodiments, the reservoir valve 266 is manipulated into a closed configuration (or a partially closed configuration), so as to increase the flow of the balanced nutrient solution (e.g., via increased pressure, etc.) to the delivery manifold 114 and/or the nutrient tubes 120 for more efficient and/or effective delivery of the balanced nutrient solution to the plant and/or vegetation. The configuration of the reservoir valve 266 (e.g., closed configuration, partially open/closed configuration, etc.) may depend on characteristics of components of the NPD system 100, for example the power output of the pump 108, as discussed above.

As shown in the exemplary embodiment of FIG. 14, the NPD system 100 also includes a cleaning device 650, which is configured to clean components of the NPD system 100 (e.g., the delivery manifold 114, the chamber 110, tubing, valves, etc.). According to an exemplary embodiment, the cleaning device 650 includes a base (e.g., shown as cleaning housing 652), a valve (e.g., shown as cleaning valve 654), an adapter (e.g., shown as cleaning adapter 656), and a fastener (e.g., shown as clip 658). In some embodiments, the cleaning device 650 includes additional, fewer, and/or different working components.

According to an exemplary embodiment, the cleaning housing 652 is a container and is configured to house a cleaning solution. The cleaning housing 652 may be a pouch, receptacle, and/or any other suitable container configured to selectively house a cleaning solution, and may be of any suitable shape (e.g., square, rectangular, circle, oval, etc.), size (e.g., 0.1, 1, 5, gallons), and/or formed of any suitable material (e.g., flexible, rigid, plastic, etc.). According to an exemplary embodiment, the cleaning housing 652 is configured to be selectively manipulated (e.g., pressure applied, pinched, pressed, squeezed, etc.) so as to selectively release the cleaning solution. The cleaning solution may be liquid (water, bleach, chlorine, etc.), concentrate, solid, and/or any other suitable cleaning solution configured to clean the components of the NPD system 100.

As shown in FIG. 14, the cleaning valve 654 is coupled to the cleaning housing 652, and is configured to control (e.g., permit, limit, restrict, prevent, etc.) movement of the cleaning solution to/from the cleaning housing 652. As discussed above with regard to other valves, in an exemplary embodiment the cleaning valve 654 is an inline ball valve; however, in some embodiments, the cleaning valve 654 is another suitable valve (e.g., solenoid valve, globe valve, gate valve, plug valve, butterfly valve, etc.). Also as shown in FIG. 14, the cleaning adapter 656 is coupled to the cleaning valve 654, and is configured to selectively couple/de-couple the cleaning device 650 to/from other components of the NPD system 100 (e.g., the delivery manifold 114, couplings, etc.). As discussed above with regard to other adapters, the cleaning adapter 656 may be any suitable adapter (e.g., quick connect, male threaded, female threaded, union, etc.). As will be discussed below, in an exemplary embodiment, the cleaning adapter 656 is configured to selectively couple/decouple to/from the manifold port 610 of the delivery manifold 114, so as to allow the cleaning solution to rinse excess nutrient and/or fluid from the delivery manifold 114 and/or the nutrient tube 120. The cleaning device 650 may also include a clip 658, which may be configured to fasten the cleaning device 650 to the reservoir 102, the lid 104, and/or another component of the NPD system 100.

Figure 10:
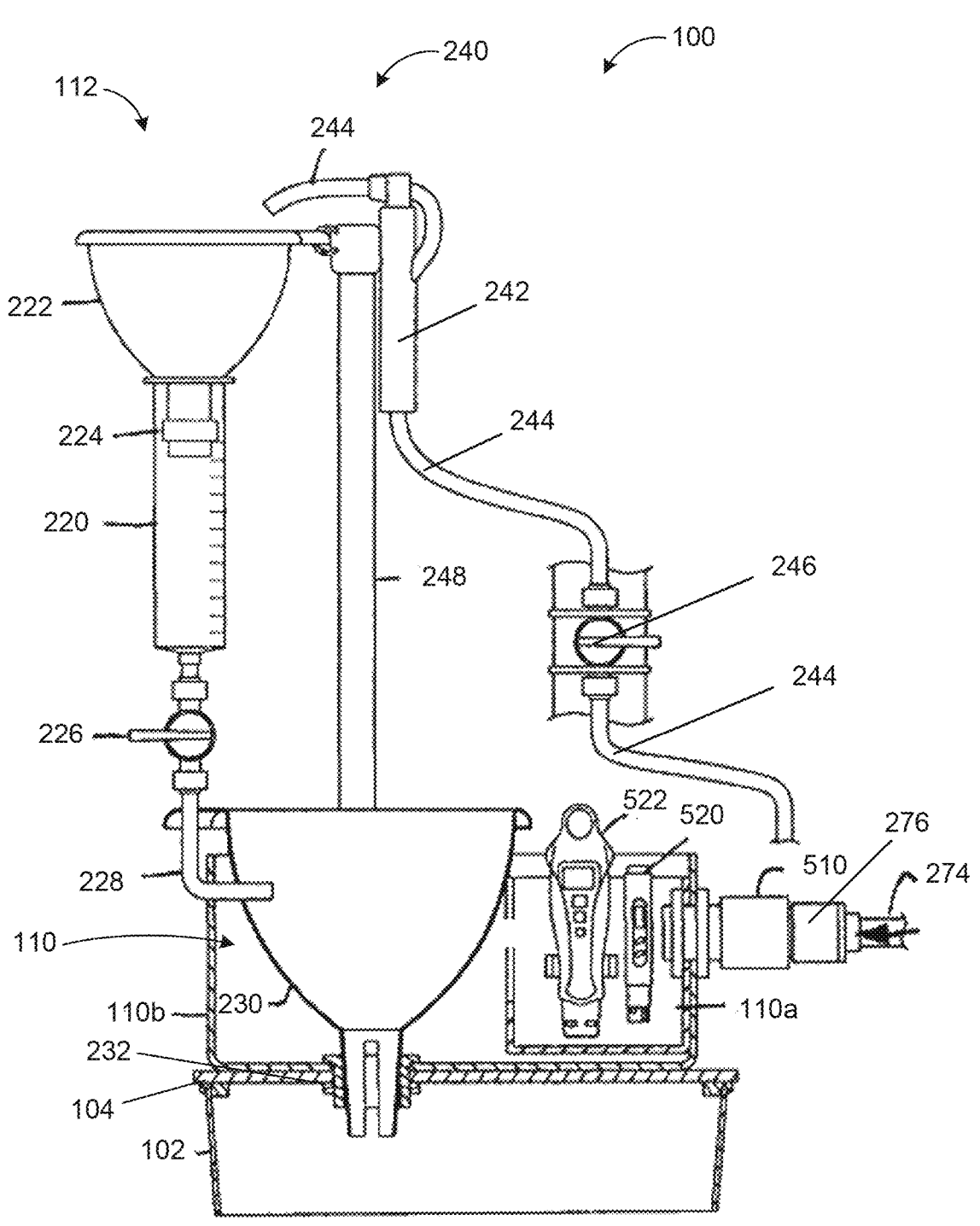
FIG. 10 is a cross-sectional side view of the NPD system of FIG. 1 showing a chamber and a measuring device, according to an exemplary embodiment.
Figure 11:
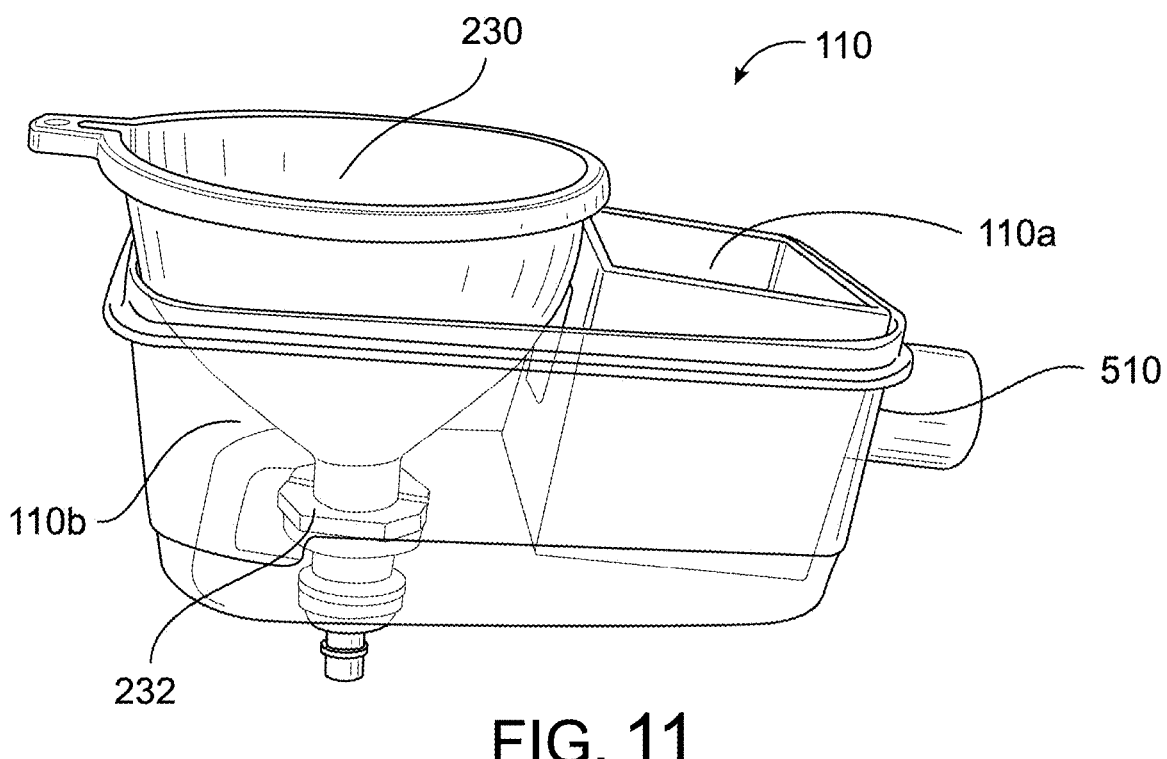
FIG. 11 is a side view of a chamber of the NPD system of FIG. 1, according to an exemplary embodiment.
Figure 12:
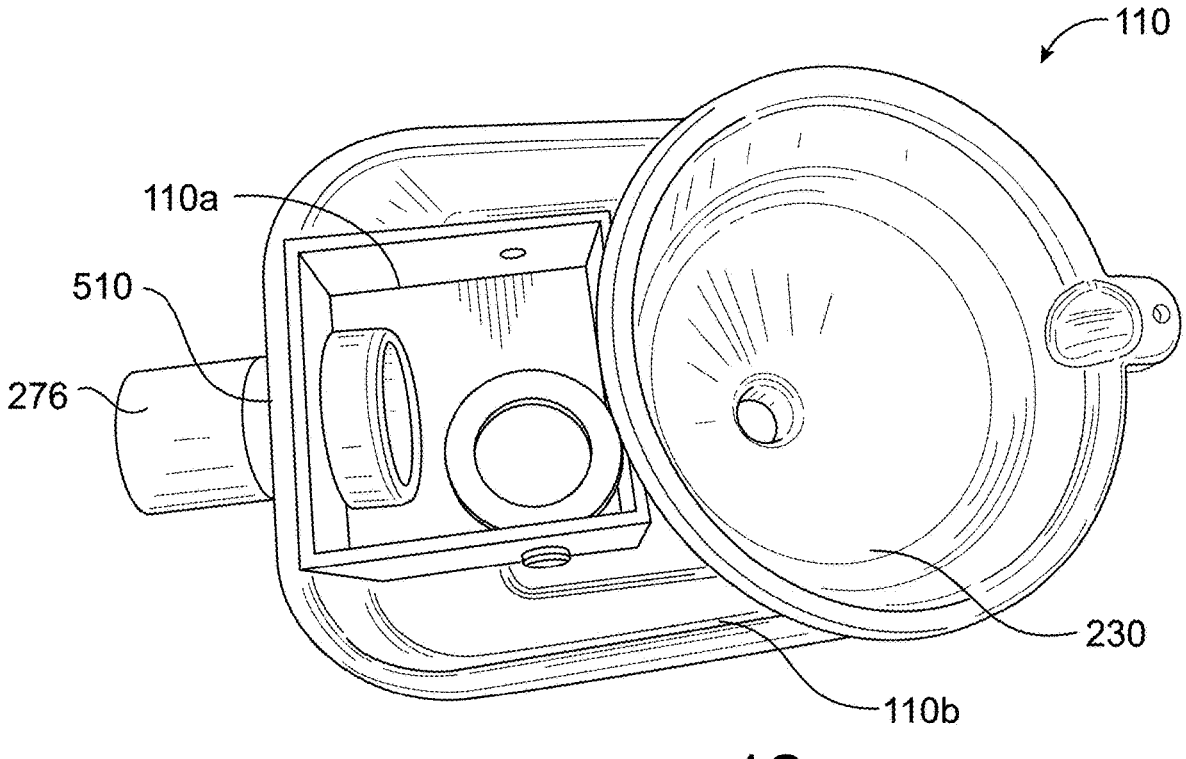
FIG. 12 is a top view of a chamber of the NPD system of FIG. 1, according to an exemplary embodiment.
Figure 13:
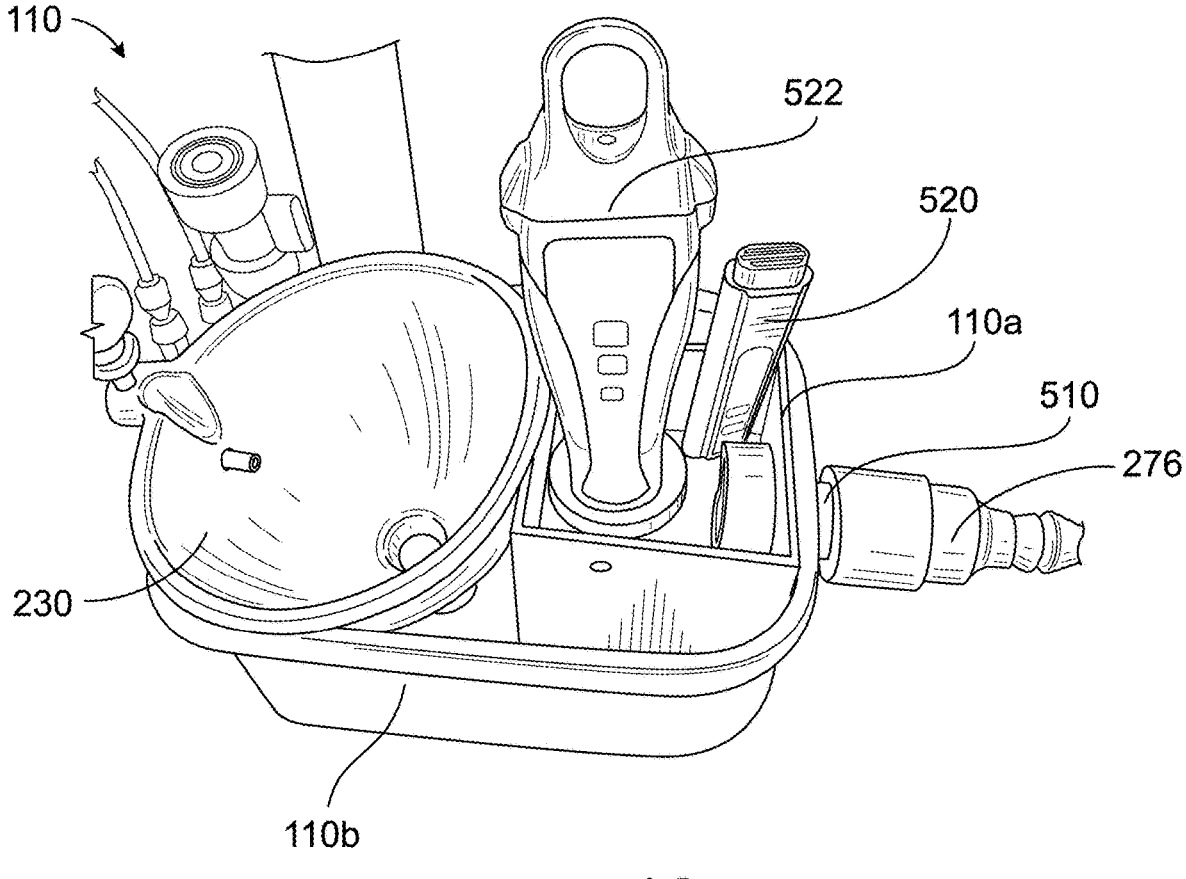
FIG. 13 is a side view of a chamber and a test kit of the NPD system of FIG. 1, according to an exemplary embodiment.

As an illustrative example, the components of the NPD system 100 of FIGS. 14-16 may be used to deliver a nutrient solution to a plant and/or a vegetation. For example, the reservoir 102 may receive an appropriate amount of fluid and nutrient (e.g., as discussed above with regard to FIGS. 2-5), and the mixer 106 and/or the pump 108 may be used to mix the fluid and nutrient to form a nutrient solution (e.g., as discussed above with regard to FIGS. 6-9). The nutrient solution may then be moved to the chamber 110 for testing and/or balancing (as discussed above with regard to FIGS. 10-13). Once the appropriate nutrient solution is attained, the balanced nutrient solution may be moved to other components of the NPD system 100, for example the delivery manifold 114 to be delivered to a plant and/or a vegetation. As discussed briefly above, after an appropriate nutrient solution is attained, the reservoir valve 266 may be in an open configuration so as to allow the nutrient solution to be recirculated within components of the NPD system (e.g., via the pump 108, through the control tubing 264, through the reservoir valve 266, back to the reservoir 102, etc.). Further, the delivery valve 268 may be in a closed configuration, and the delivery adapter 276 may be de-coupled from the chamber port 510 (as shown in FIG. 10), and coupled to the manifold port 610 (as shown in FIG. 14). In some embodiments, the delivery valve 268 is in a closed configuration, and the nutrient tubes 120 are coupled to delivery ports 612 and/or the root zones of a plant and/or vegetation. Once coupled, the delivery valve 268 may be manipulated into an open configuration. In some embodiments, the reservoir valve 266 remains in an open configuration (e.g., in order to recirculate the balanced nutrient solution); however, in some embodiments the reservoir valve 266 is manipulated into a closed configuration (or a partially closed configuration), for example to increase the flow of the balanced nutrient solution to the delivery manifold 114. As discussed above, as the pump 108 moves the balanced nutrient solution at the bottom of the reservoir 102 through the pump tube 260, the junction 262, the control tubing 264, the delivery valve 268, the delivery tube 274, and the delivery adapter 276, the balanced nutrient solution may move through the manifold port 610 and to the delivery manifold 114.

The delivery manifold 114 may receive the balanced nutrient solution, and may move the balanced nutrient solution to the nutrient tubes 120 (e.g., via the delivery ports 612). In an exemplary embodiment, all of the delivery ports 612 are coupled to nutrient tubes 120, and the balanced nutrient solution is moved through the nutrient tubes 120 to a plurality of plants. In some embodiments, a portion of the delivery ports 612 are deactivated (e.g., in a closed configuration, not coupled to a nutrient tube, deactivated via a timer, sensor, on/off switch, etc.), and the balanced nutrient solution is moved through a portion of the nutrient tubes 120 to a portion of the plants. In some embodiments, the delivery manifold 114 is coupled with another system or device (e.g., a hydroponic system, an ebb/flow system, a flood/drain table, a bucket system, etc.), and is configured to deliver the balanced nutrient solution to the other system or device. For example, the delivery manifold 114 (e.g., via the pump 108) may be configured to deliver the balanced nutrient solution to a hydroponic system at predetermined intervals (e.g., every 15, 30, 60, 90, 120, 180, etc. minutes), so as to selectively provide the balanced nutrient system to a portion of a plant (e.g., the root zone). In some embodiments, the delivery manifold 114 (e.g., via the pump 108) is configured to transition between one or more configurations (e.g., active and inactive), so as to selectively provide the balanced nutrient solution to plants and/or the other systems or devices.

Once an appropriate amount (e.g., desired, preferred, predetermined, a range, measured, etc.) of the balanced nutrient solution is received by the delivery manifold 114 and/or moved to the plants or vegetation (e.g., via the nutrient tubes 120), the delivery valve 268 may be manipulated into a closed configuration (and/or the pump 108 may be deactivated). In this regard, once an appropriate amount of the balanced nutrient solution is received by the plants and/or vegetation, the delivery valve 268 and/or the pump 108 may stop (e.g., restrict, prevent, etc.) the movement of the balanced nutrient solution from the reservoir 102. The delivery adapter 276 may then be de-coupled (e.g., disconnected, etc.) from the manifold port 610, and the cleaning adapter 656 of the cleaning device 650 may be coupled (e.g., connected, etc.) to the manifold port 610 in preparation for cleaning. In an exemplary embodiment, the cleaning valve 654 is manipulated into an open configuration, and the cleaning housing 652 is manipulated (e.g., squeeze, pressed, pressure applied, etc.). This may cause the cleaning solution to move from the cleaning housing 652 (i.e., through the cleaning valve 654) to the delivery manifold 114. The cleaning solution may move (e.g., be forced, etc.) through the components of the delivery manifold 114 (e.g., the manifold port 610, the delivery ports 612) and the nutrient tubes 120, so as to remove any excess nutrient and/or nutrient solution that remains. In an exemplary embodiment, the nutrient tubes 120 remain coupled to the plants or vegetation (e.g., during cleaning, after use, etc.), so as to reduce time, energy, wear/tear associated with coupling/de-coupling the nutrient tubes 120 to/from other components of the NPD system 100. In some embodiments, the cleaning device 650 may similarly be applied to other components of the NPD system 100 (e.g., the chamber 110, the measuring device 112, the reservoir tube 272, etc.), so as to remove excess nutrient and/or nutrient solution from other components. In some embodiments, after the delivery adapter 276 is de-coupled from the manifold port 610, the delivery adapter 276 is then coupled to the chamber port 510, and a nutrient solution can again be prepared, mixed, balanced, and/or delivered, as discussed above.

Referring generally to FIGS. 17-20, schematic diagrams of a process for preparing, mixing, balancing, and/or delivering a nutrient solution using a nutrient preparation and delivery system is shown, according to an exemplary embodiment. In an exemplary embodiment, the nutrient preparation and delivery system is the NPD system 100 of FIGS. 1-16.

Figure 17:
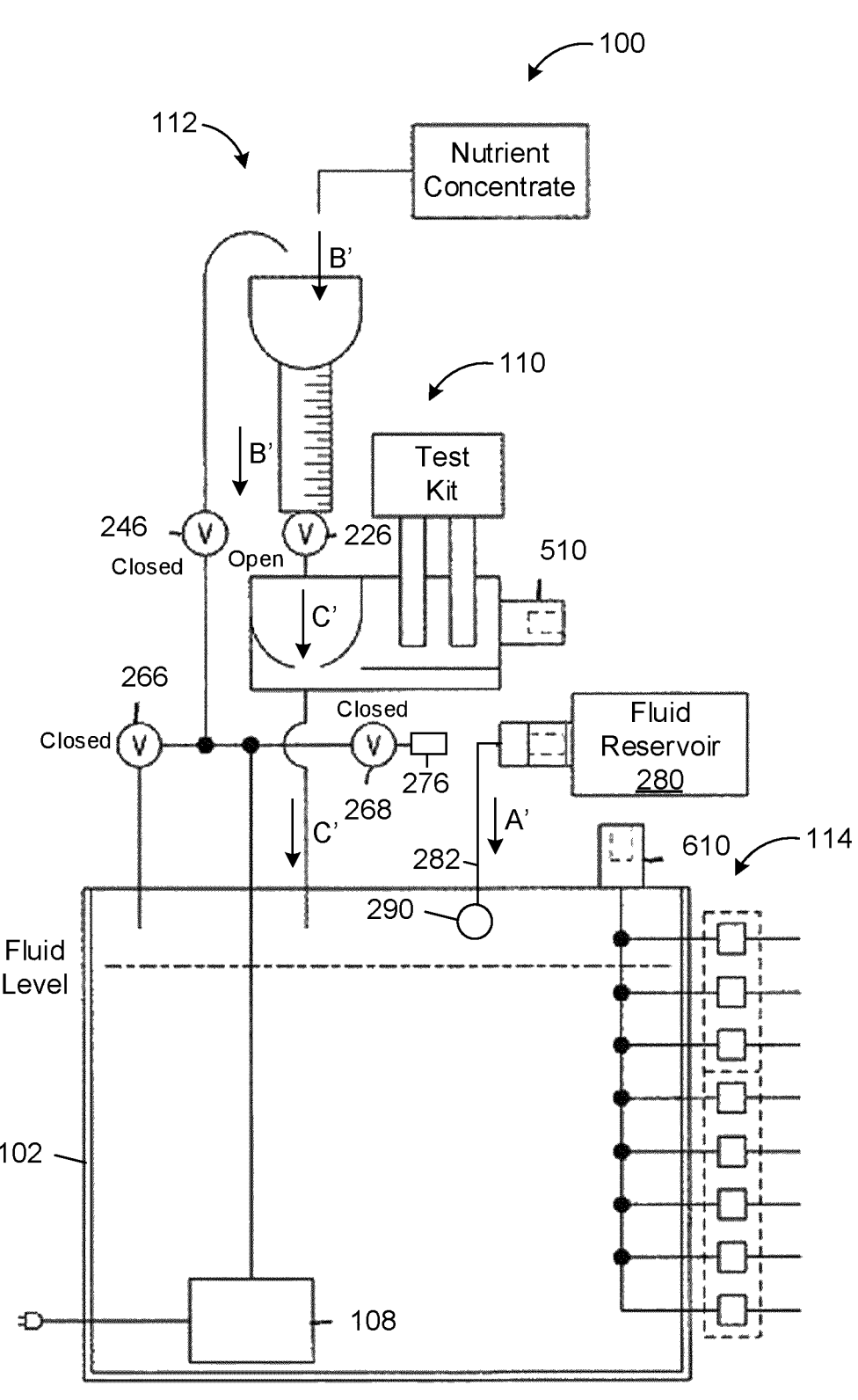
FIG. 17 is a schematic diagram illustrating a preparation process that includes adding a nutrient concentrate and a fluid to a reservoir via the NPD system of FIG. 1, according to an exemplary embodiment.

Referring now to FIG. 17, a schematic diagram of a process for preparing a nutrient solution using the NPD system 100 of FIGS. 1-16 is shown, according to an exemplary embodiment. In an exemplary embodiment, the preparation process involves the reservoir 102 receiving an appropriate amount of fluid (e.g., water, solvent, a fluid having predetermined characteristics, for example pre-adjusted pH levels, etc.). The reservoir 102 may receive the appropriate amount of fluid by removing the lid 104 (e.g., as shown in at least FIG. 2), via components of the measuring device 112, via an aperture in the lid 104 and/or the chamber 110, etc. In the exemplary embodiment shown in FIG. 17, the reservoir 102 receives the fluid by coupling components of the NPD system 100 to a fluid reservoir 280 (e.g., a fluid reservoir, a transfer tube, a reverse osmosis system, etc.). For example, the fluid reservoir 280 may be configured to selectively couple/de-couple a float valve 290 of the reservoir 102 (e.g., via a transfer tube 282). According to an exemplary embodiment, the fluid may move from the fluid reservoir 280, through the transfer tube 282 and/or the float valve 290, and to the reservoir 102 (e.g., shown as a path A'). The float valve 290 may be configured to automatically (e.g., hands-free, without manual manipulation, etc.) restrict or stop to flow of fluid into the reservoir 102, so as to permit the fluid to reach an appropriate point or level (e.g., as indicated by a fill line, a predetermined amount, a preferred ratio, etc.). In some embodiments, the float valve is coupled to the lid 104 and/or a top portion of the reservoir 102, so as to permit the fluid to reach an appropriate point or level. In some embodiments, the delivery adapter 276 may be configured to selectively couple/de-couple to/from the fluid reservoir 280. In this regard, the delivery valve 268 and the reservoir valve 266 may be manipulated into an open configuration (e.g., with the rinse valve 246 in a closed configuration), and the fluid may move from the fluid reservoir 280, through the delivery valve 268 and/or the reservoir valve 266, and/or to the reservoir 102.

According to an exemplary embodiment, the preparation process also involves the reservoir 102 receiving an appropriate amount of nutrient. As discussed above, the components of the measuring device 112 may receive an appropriate amount of nutrient, and selectively provide the nutrient to the reservoir 102. For example, the funnel 222 may receive the nutrient, and facilitate movement of the nutrient to the measuring base 220. The measuring valve 226 may be (initially) in a closed configuration, so as to prevent movement of the nutrient from the measuring device 112 to other components of the NPD system 100 (e.g., the reservoir 102) (e.g., as shown via path B'). As shown in FIG. 17, once the appropriate amount of nutrient is received by the measuring device 112, the measuring valve 226 may be manipulated into an open configuration, causing the nutrient to move (through the measuring base 220, the measuring valve 226, the measuring tube 228, the deliverer 230, etc.) to the reservoir 102 (e.g., shown via a path C'). In some embodiments, the aforementioned process (e.g., receive a nutrient, house a nutrient, move a nutrient to the reservoir 102, etc.)

is repeated, for example to provide additional nutrient (e.g., a different nutrient, a different amount of nutrient, etc.) to the reservoir 102.

Figure 18:
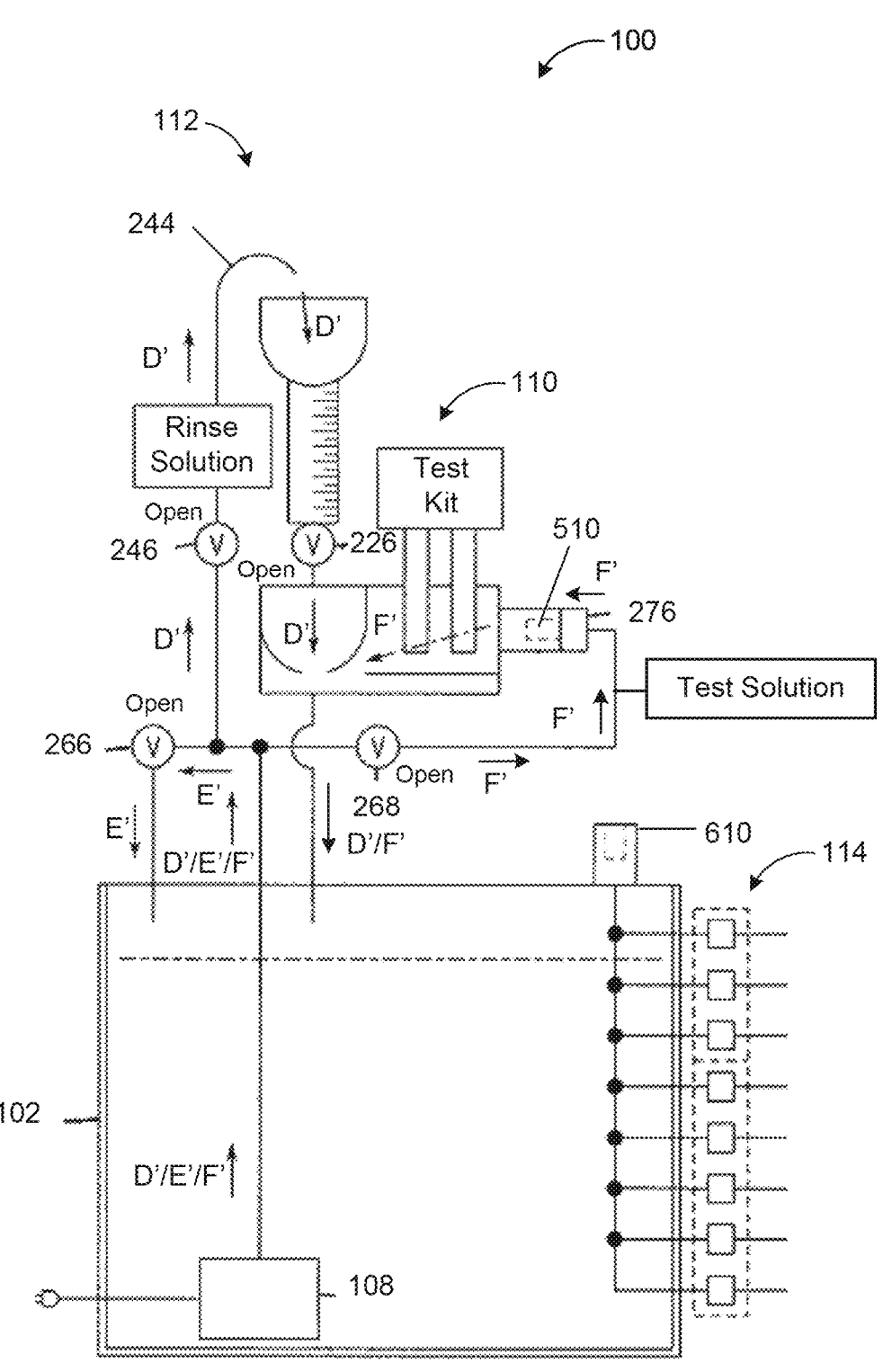
FIG. 18 is a schematic diagram illustrating a preparation process that includes testing a nutrient solution using the NPD system of FIG. 1, according to an exemplary embodiment.

Referring now to FIG. 18, a schematic diagram of another process for preparing a nutrient solution using the NPD system 100 of FIGS. 1-16 is shown, according to an exemplary embodiment. In an exemplary embodiment, the preparation process also includes rinsing (e.g., cleaning) the measuring device 112, so as to remove any excess nutrient from components of the measuring device 112 (e.g., to avoid precipitate formation, prevent melding of concentrates and solution suspension, etc.). As discussed above, after the nutrient is received by the reservoir 102, the pump 108 may be activated and the rinse valve 246 may be manipulated into an open configuration (e.g., with the reservoir valve 266 in an open configuration for recirculating, the delivery valve 268 in an open configuration for testing, etc. as discussed below). In this regard, as the fluid at the bottom of the reservoir 102 is moved via the pump 108 through components of the NPD system 100 (e.g., through the pump tube 260, the junction 262, the control tubing 264, the tube coupler 270, etc.) the fluid may move through the rinse tube 244 and to the measuring device 112 (shown as a path D'). The fluid may then leave an end of the rinse tube 244, and enter components of the measuring device 112 (e.g., the funnel 222, the measuring base 220, etc.), so as to remove any excess nutrient. With the measuring valve 226 (e.g., remaining) in an open configuration, the fluid may flow through the measuring valve 226 (and the measuring tube 228, the deliverer 230, etc.) and to the reservoir 102 (as shown by the path D'). In this regard, as the fluid moves through the components of the measuring device 112, the fluid may remove excess nutrient that remains in the measuring device 112, and provide the nutrient to the reservoir 102 (e.g., for a more precise amount). In some embodiments, after the measuring device 112 is rinsed of excess nutrient, additional nutrient may be provided to the reservoir 102, for example by the steps of the preparation process described in FIG. 17, above (e.g., preparing an additional nutrient, the path B' and C' of FIG. 17, discussed above, etc.).

Referring still to FIG. 18, a schematic diagram of a process for mixing a nutrient solution using the NPD system 100 of FIGS. 1-16 is shown, according to an exemplary embodiment. In an exemplary embodiment, the mixing process involves moving (e.g., circulating, etc.) the nutrient solution through components of the NPD system 100. As discussed above, after the appropriate amount of fluid and nutrient are received by the reservoir 102 (and the pump 108 is activated), the reservoir valve 266 is an open configuration (e.g., with the rinse valve 246, the delivery valve 268, etc. in an open configuration). In this regard, as the nutrient solution at the bottom of the reservoir 102 is moved via the pump 108 through components of the NPD system 100 (e.g., through the pump tube 260, the junction 262, the control tubing 264, etc.) the nutrient solution may move through the reservoir valve 266 and to the reservoir tube 272. The reservoir tube 272 may be coupled to the reservoir 102 (e.g., at an opening, drain, etc.), and further move the nutrient solution to the reservoir 102 (e.g., via an aperture in the reservoir 102, etc.) so as to recirculate and/or mix the nutrient solution in the reservoir 102 (e.g., shown via a path E').

Figure 19:
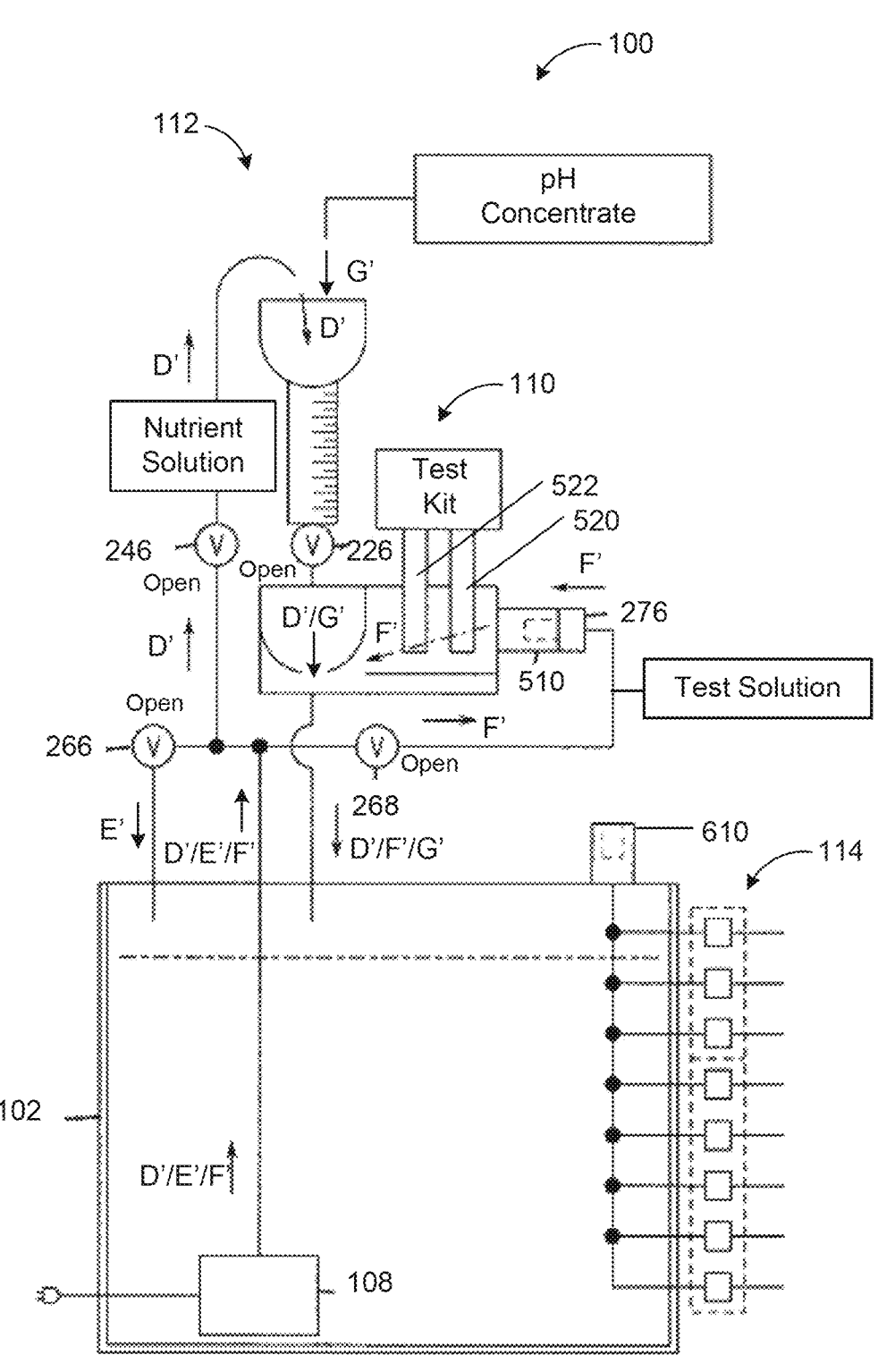
FIG. 19 is a schematic diagram illustrating a balancing process that includes adding a pH concentrate to a nutrient solution using the NPD system of FIG. 1, according to an exemplary embodiment.

Referring now to FIGS. 18-19, schematic diagrams of a process for balancing (e.g., testing regulation of elements, for example pH, EC, TDS, etc.) a nutrient solution using the NPD system 100 of FIGS. 1-16 is shown, according to an exemplary embodiment. In an exemplary embodiment, the balancing process involves moving the nutrient solution to the chamber 110 for testing. As discussed above, after the fluid and the nutrient are mixed, the delivery adapter 276 may be coupled to the chamber port 510. Further, with the pump 108 activated, the delivery valve 268 may be in an open configuration (e.g., with the rinse valve 246, the reservoir valve 266, etc. in open configurations). In this regard, as the nutrient solution at the bottom of the reservoir 102 is moved via the pump 108 through components of the NPD system 100 (e.g., through the pump tube 260, the junction 262, the control tubing 264, the delivery valve 268, the delivery tube 274, delivery adapter 276, etc.), the nutrient solution may move through the chamber port 510 and to the chamber 110 (e.g., as shown via path F'). The chamber 110 may receive the nutrient solution, and the test kit (e.g., the test pen 520 and/or the test meter 522) may interact with the nutrient solution to provide a test result (or a plurality of test results). Further, with the pump 108 activated, the nutrient solution may move (e.g., flow) to the chamber 110, such that test results may be provided at continuous, periodic, predetermined, and/or any other suitable time period(s). According to an exemplary embodiment, the chamber 110 is configured to house a first portion of the nutrient solution (e.g., for testing, storage, etc.), and provide (e.g., return, etc.) a second portion of the nutrient solution to the reservoir 102. In this regard, the chamber 110 may provide a portion (e.g., a second portion) of the nutrient solution to the reservoir 102 for further mixing, storage, etc. (e.g., as shown via path F'). As indicated above, the aforementioned process may be repeated, for example to provide a continuous movement (e.g., flow) of the fluid along paths E' and F', so as to provide a plurality of test results (e.g., continuous, periodic, etc.), mixing (e.g., continuous, periodic, etc.), and/or circulation of the nutrient solution.

After the test results of the nutrient solution are provided, it may be determined whether the characteristics of the nutrient solution are appropriate (e.g., desired, preferred, correct, within a predetermined range, etc.). If the results are not appropriate, additional preparation and/or mixing may be completed (e.g., a nutrient concentrate may be added, a pH concentrate may be added, etc.). For example, with the nutrient solution moving from the bottom of the reservoir 102 (e.g., via the pump 108), through the rinse tube 244, and to the measuring device 112 (shown as path D', and as discussed above in FIG. 18), a pH concentrate may be added to the measuring device 112 (e.g., as shown in path G'). With the measuring valve 226 (e.g., remaining) in an open configuration, the nutrient solution and pH concentrate may flow through the measuring valve 226 (e.g., the measuring tube 228, the deliverer 230, etc.) and to the reservoir 102 (as shown by the path G') for further mixing. In some embodiments, a concentrate (e.g., a pH concentrate) may be added directly to the reservoir 102 (e.g., via an aperture) and/or another component of the NPD system 100 (e.g., the second chamber portion 110b, etc.) for further mixing. With the nutrient solution (e.g., and pH concentrate) mixed, as discussed above, the nutrient solution may be moved to the chamber 110 for additional testing (e.g., along path F'). The test result (or plurality of test results) may be monitored (e.g., to determine whether the characteristics of the nutrient solution are appropriate), and/or the aforementioned process may be repeated, for example by adding small amounts of concentrate (e.g., pH concentrates) to the nutrient solution until the characteristics of the nutrient solution are appropriate. Further, the preparation processes described in FIGS. 17-18 (e.g., preparing a fluid, preparing a nutrient, rinsing the measuring device, etc.) may be repeated. Similarly, the mixing process described in FIG. 18 (e.g., moving the fluid through the reservoir valve back to the reservoir, etc.) may be repeated. In some embodiments, other preparing and/or mixing processes described herein may be completed and/or repeated. Once the additional preparation and/or mixing is/are completed, if necessary, the nutrient solution may be moved to the chamber 110 for subsequent testing. According to an exemplary embodiment, the processes described in FIGS. 17-19 may be repeated until an appropriate (e.g., desired, preferred, correct, within a predetermined range, etc.) nutrient solution is attained.

According to an exemplary embodiment, after the appropriate nutrient solution is attained, the nutrient solution may be cycled through components of the NPD system 100. For example, the nutrient solution may be cycled through the reservoir valve 266 and back to the reservoir 102 (e.g., similar to the mixing process described in FIG. 18, which moves the nutrient solution through the reservoir valve 266 back to the reservoir 102, etc.). In this regard, the appropriate nutrient solution may be continuously recirculated (e.g., in preparation for delivery, etc.).

Figure 20:
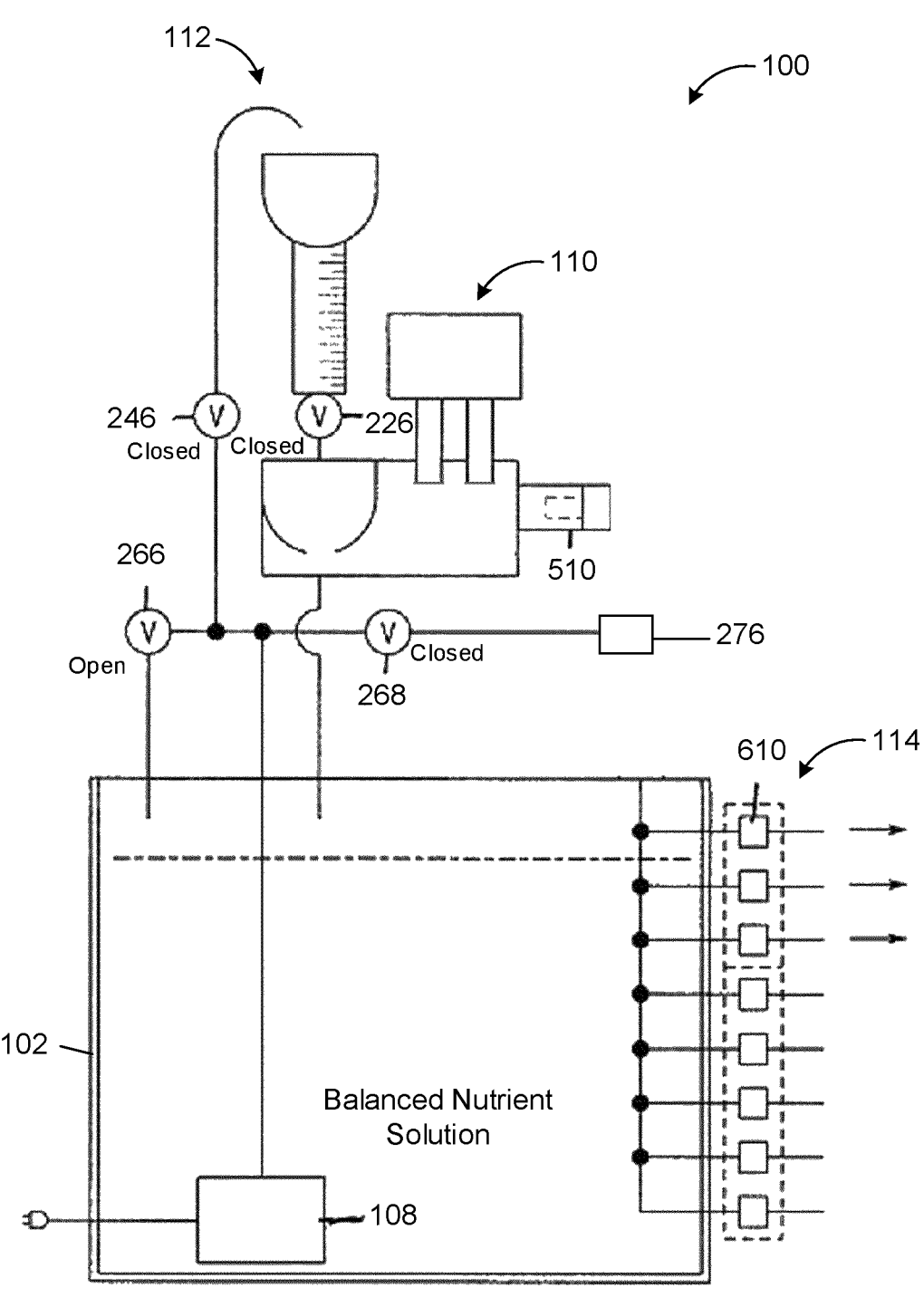
FIG. 20 is a schematic diagram illustrating a transition from a balancing process to a delivery process using the NPD system of FIG. 1, according to an exemplary embodiment.

Referring now to FIG. 20, a schematic diagram of a process for preparing to deliver a nutrient solution using the NPD system 100 of FIGS. 1-16 is shown, according to an exemplary embodiment. In an exemplary embodiment, the delivery process involves moving the nutrient solution to the delivery manifold 114 (e.g., for further delivery to a plant and/or a vegetation). As discussed above, after the fluid and the nutrient are mixed, and the appropriate nutrient solution is attained, the delivery valve 268 may be manipulated into a closed configuration (with the reservoir valve 266 in an open configuration). With the delivery valve 268 in a closed configuration, the delivery adapter 276 may be de-coupled (e.g., disconnected) from the chamber port 510, and coupled (e.g., connected) to the manifold port 610.

Figure 21:
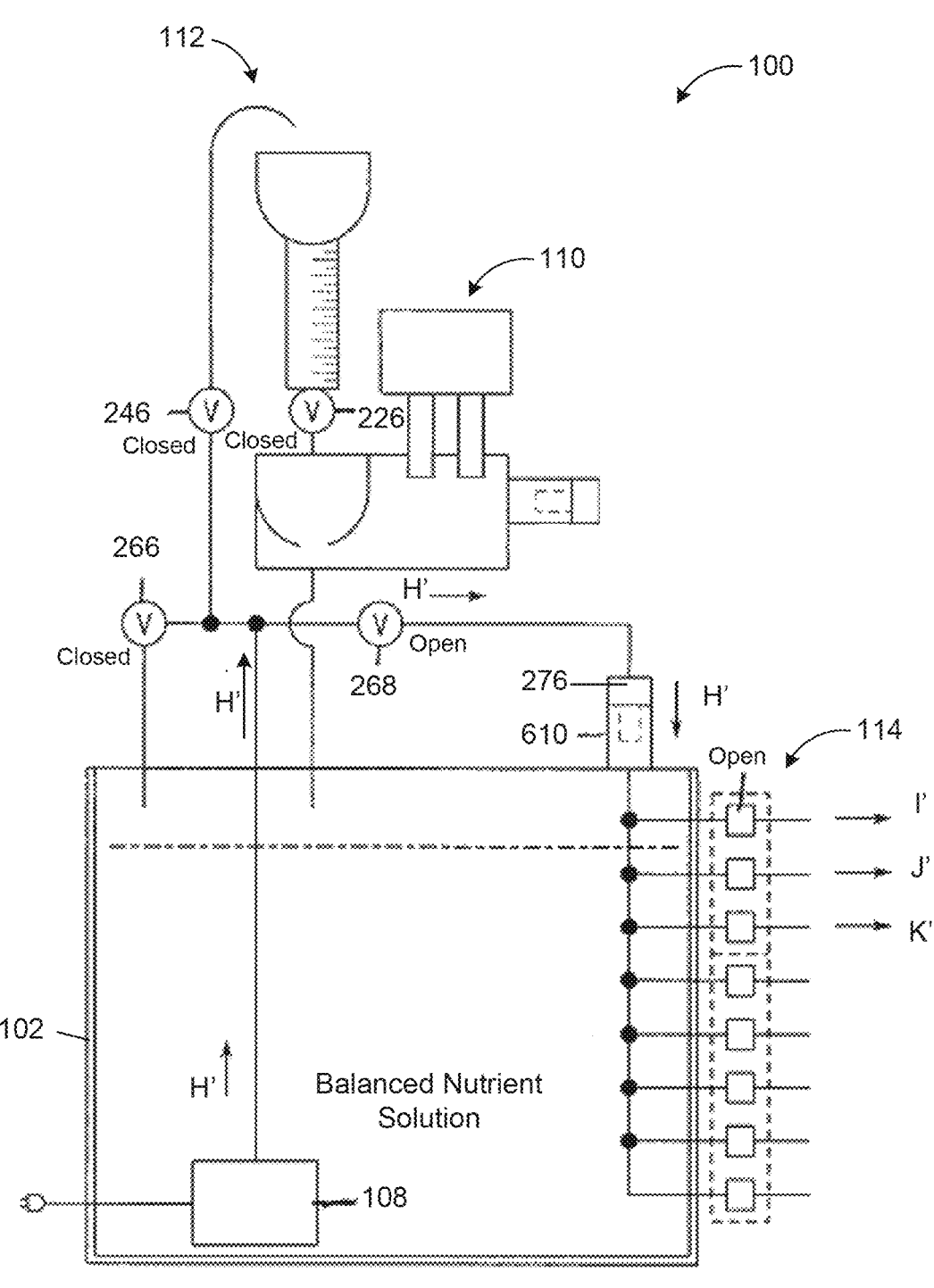
FIG. 21 is a schematic diagram illustrating a delivery process using the NPD system of FIG. 1, according to an exemplary embodiment.

Referring now to FIG. 21, a schematic diagram of a process for delivering a balanced nutrient solution using the NPD system 100 of FIGS. 1-16 is shown, according to an exemplary embodiment. In an exemplary embodiment, with the delivery adapter 276 coupled to the manifold port 610 (and the pump 108 activated), the delivery valve 268 may be manipulated into an open configuration. As shown in FIG. 21, in some embodiments the rinse valve 246 and/or the reservoir valve 266 may be manipulated into a closed configuration, for example to increase the flow of the balanced nutrient solution to the delivery manifold 114. In this regard, as the balanced nutrient solution at the bottom of the reservoir 102 is moved via the pump 108 through components of the NPD system 100 (e.g., through the pump tube 260, the junction 262, the control tubing 264, the delivery valve 268, the delivery tube 274, delivery adapter 276, etc.), the balanced nutrient solution may move through the manifold port 610 and to the delivery manifold 114 (e.g., as shown via path H'). According to an exemplary embodiment, the delivery manifold 114 is coupled to a plurality of tubes (e.g., nutrient tubes 120), which are configured to move the balanced nutrient solution from the delivery manifold 114 to a plurality of plants and/or vegetation (e.g., as shown via paths I', J', and K'). As shown in FIG. 21, the delivery manifold 114 may move the balanced nutrient solution to three nutrient tubes 120 (e.g., and three plants via the paths I', J', and K'). In some embodiments, the delivery manifold 114 may move the balanced nutrient solution to any number of suitable nutrient tubes 120 (e.g., and/or plants).

It should be understood that components in any, or all, of the apparatuses, systems, and/or methods described herein may be coupled in any suitable configuration and/or orientation. For example, in an exemplary embodiment, the pump 108, the tubing (e.g., the pump tube 260, control tubing 264, reservoir tube 272, etc.), the valves (e.g., the junction 262, the reservoir valve 266, the rinse valve 246, the delivery valve 268, etc.), the chamber 110, the measuring device 112, the rinse device 240 (e.g., the rinse housing 242, the rinse tube 244, etc.), the delivery manifold 114, and/or another component of the NPD system 100 is/are configured to selectively attach and/or detach. In some embodiments, the pump 108, the tubing (e.g., the pump tube 260, control tubing 264, reservoir tube 272, etc.), the valves (e.g., the junction 262, the reservoir valve 266, the rinse valve 246, the delivery valve 268, etc.), the chamber 110, the measuring device 112, the rinse device 240 (e.g., the rinse housing 242, the rinse tube 244, etc.), the delivery manifold 114, and/or another component of the NPD system 100 is/are configured to clamp, hang, bracket, and/or otherwise be coupled with the reservoir 102 (e.g., at a rim, ledge, wall, base, bottom, top, etc. of the reservoir 102).

It should also be understood that any, or all, of the apparatuses, systems, and/or methods described herein may incorporate automated devices and/or systems, such that the NPD system 100 may function automatically. For example, the valves of the NPD system 100 (e.g., the measuring valve 226, the rinse valve 246, the reservoir valve 266, the delivery valve 268, etc.) may include automated devices/ systems (e.g., sensors, timers, actuators, motors, switches, etc.), which may be configured to automatically control the position, orientation, timing, etc. of the valves. Further, the pump 108, the chamber 110 (e.g., test kit, test pen 520, the test meter 522, the chamber port 510), the delivery manifold 114 (e.g., the manifold port 610, the delivery ports 612, etc.) may include automated devices/systems (e.g., sensors, timers, actuators, motors, switches, etc.), which may be configured to automatically control the functions of these components. Accordingly, the NPD system 100 may make use of hardware, such as a controller or data processing component (e.g., processing circuit comprising a processor and memory) to carry out the automated functionality.

In addition, all or some of the components described in the NPD system 100 may be provided in a kit, which may be in a pre-packaged arrangement and/or a separate arrangement. For example, the reservoir 102, the lid 104, the pump 108, the chamber 110, and the delivery manifold 114 may be provided in a preassembled arrangement or assembly. In this regard, the reservoir 102, the lid 104, the pump 108, the chamber 110, the measuring device 112, and/or the delivery manifold 114 may be unpackaged and utilized in combination with a fluid and a nutrient. In some embodiments, the reservoir 102, the mixer 106, the pump 108, the chamber 110, and/or the delivery manifold 114 are provided in a preassembled arrangement or assembly, which may be unpacked and utilized in combination with a fluid and a nutrient. In addition, the chamber 110 and the test kit may be packaged together in a kit, which may be unpackaged and utilized with other components of the NPD system 100. Further, the chamber 110 with the test kit, and the measuring device 112 may be packaged together as a kit, which may be unpackaged and utilized with other components of the NPD system 100. It should be understood that other packaging arrangements are contemplated in some embodiments.

Figure 22:
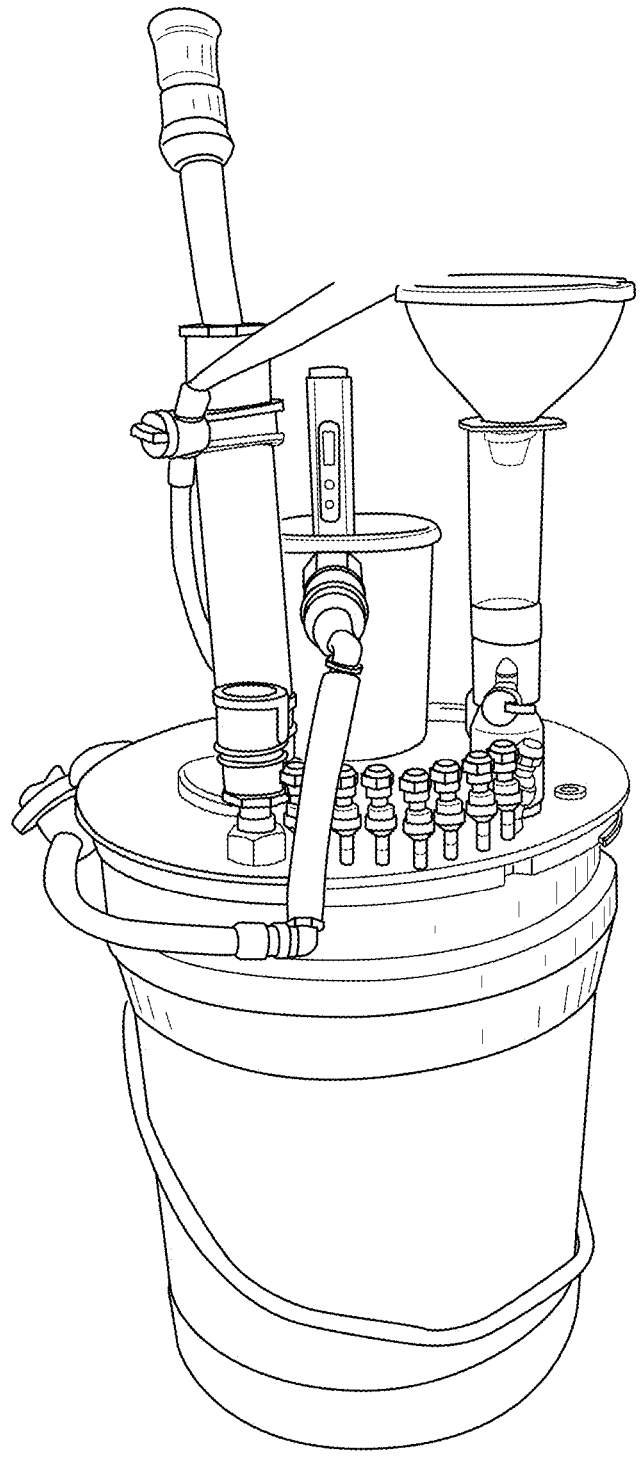
FIG. 22 is a perspective view of the NPD system of FIG. 1, according to an exemplary embodiment.
Figure 23:
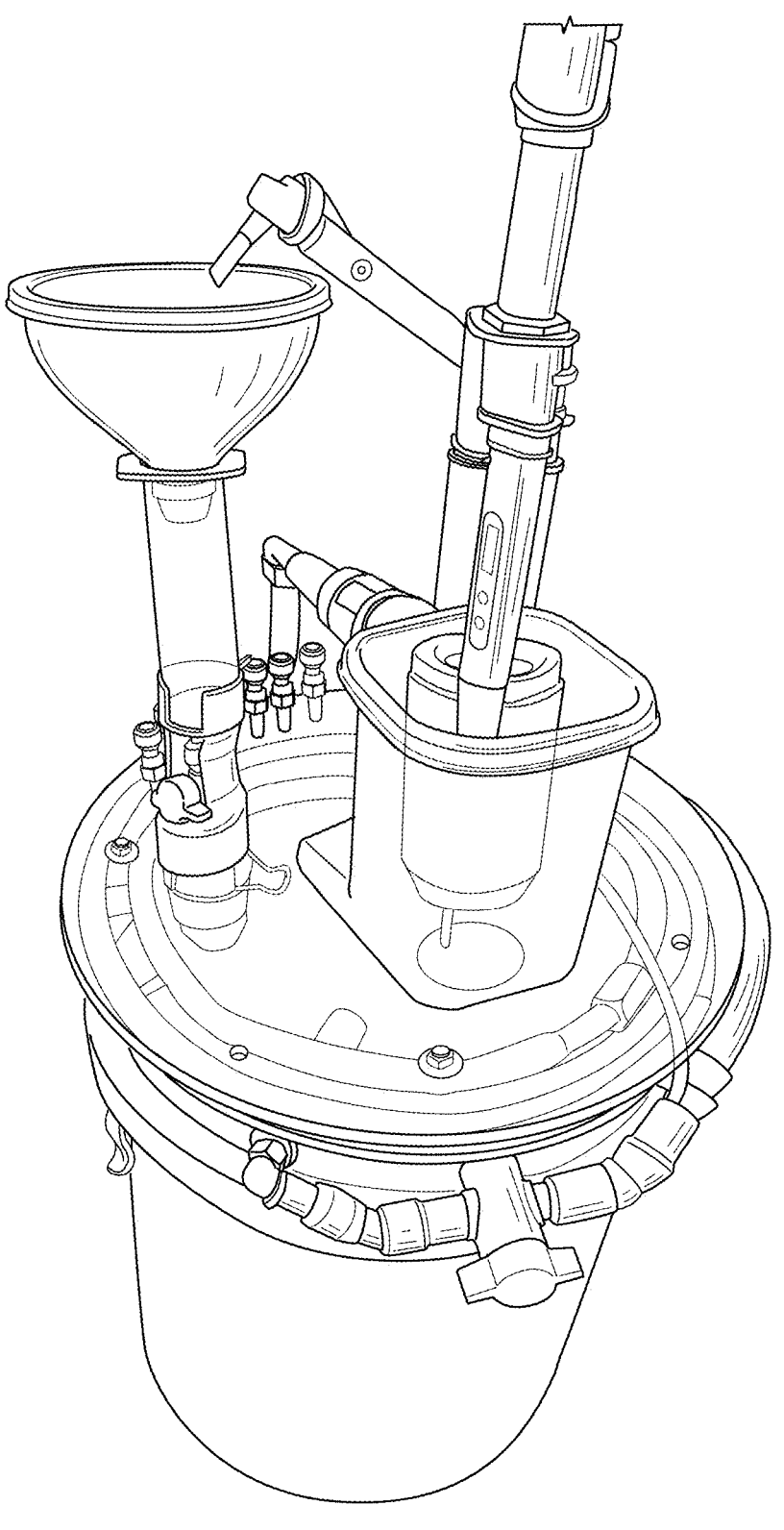
FIG. 23 is a perspective view of the NPD system of FIG. 1, according to an exemplary embodiment.
Figure 24:
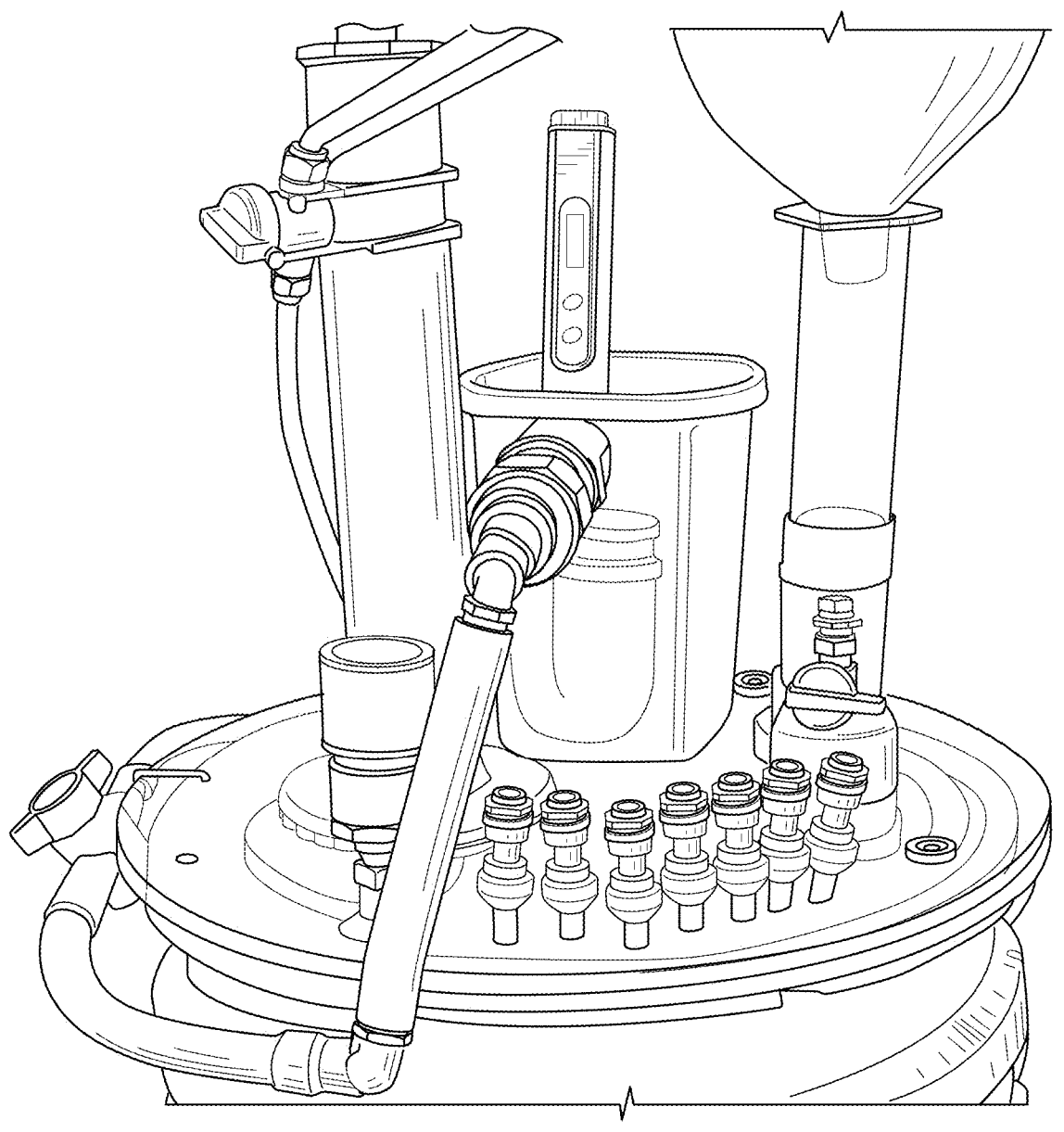
FIG. 24 is a side view of components of the NPD system of FIG. 1 showing a chamber, a test kit, and a delivery manifold coupled to a lid, according to an exemplary embodiment.

Referring now to FIGS. 22-24, components of a nutrient preparation and delivery system are shown, according to an exemplary embodiment. In an exemplary embodiment, the components of the nutrient preparation and delivery system of FIGS. 22-24 are components of the NPD system 100 of FIGS. 1-21. For example, the reservoir and the lid of FIGS. 22-24 may be the reservoir 102 and the lid 104 of FIGS. 1-21. In an exemplary embodiment, the mixer of FIGS. 22-24 is the mixer 106 of FIGS. 1-21. The chamber and test kit of FIGS. 22-24 may be the chamber 110 and the test kit (shown as test pen 520 and test meter 522) of FIGS. 1-21. In an exemplary embodiment, the measuring device of FIGS. 22-24 is the measuring device 112 of FIGS. 1-21. Further, the delivery manifold and tubes of FIGS. 22-24 may be the delivery manifold 114 and the tubes 120 of FIGS. 1-21.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "uncoupled" and variations thereof ("decouple," "decouple," etc.), as used herein, means disconnecting of two members directly or indirectly from one another. Such disconnecting may be achieved with the two members disconnecting directly from each other, with the two members disconnecting from each other using a separate intervening member and any additional intermediate members disconnecting with one another, or with the two members disconnecting from each other using an intervening member that is integrally formed as a single unitary body with one of the two members. If "uncoupled" or variations thereof ("de-coupled," "decoupled," etc.) are modified by an additional term (e.g., directly uncoupled, directly de-coupled, etc.), the generic definition of "uncoupled" ("de-coupled," "decoupled") provided above is modified by the plain language meaning of the additional term (e.g., "directly uncoupled," "directly de-coupled," etc.) and means the disconnecting of two members without any separate intervening member), resulting in a narrower definition than the generic definition of "uncoupled" provided above. Such uncoupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the Figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the systems, apparatuses, and methods shown in the various exemplary embodiments is illustrative only. Additionally, any element disclosed in one embodiment may be incorporated or utilized with any some embodiment disclosed herein. For example, any of the exemplary embodiments described in this application can be incorporated with any of the other exemplary embodiment described in the application. Although only one example of an element from one embodiment that can be incorporated or utilized in some embodiments has been described above, it should be appreciated that other elements of the various embodiments may be incorporated or utilized with any of the some embodiments disclosed herein.

What is claimed is:

1. A plant nutrient system, comprising:
a reservoir configured to receive a fluid and a predetermined amount of nutrient;
a measuring device coupled to the reservoir, wherein the measuring device is configured to provide the predetermined amount of nutrient to the reservoir;
a rinse device coupled with the measuring device, the rinse device configured to provide a rinse solution to the measuring device to remove residual nutrient from the measuring device;
a mixer positioned within the reservoir, wherein the mixer is configured to be manipulated in a vertical direction to selectively mix the fluid and the predetermined amount of nutrient to form a nutrient solution, wherein the mixer includes a single grated paddle including a body and a plurality of orifices, wherein each orifice of the plurality of orifices extends through the body of the paddle perpendicular to the vertical direction and have the same size, and wherein each of the plurality of orifices is configured to aerate the nutrient solution within the reservoir;
a pump positioned within the reservoir, wherein the pump is configured to selectively mix the fluid and the predetermined amount of nutrient to form the nutrient solution, and wherein the pump is configured to move the nutrient solution from the reservoir; and
a chamber having a first chamber and a second chamber, the first chamber positioned within the second chamber and in fluid communication with the second chamber, wherein the first chamber houses a test kit and is configured to receive the nutrient solution from the pump such that the test kit interacts with the nutrient solution in the first chamber and provides a test result relating to the nutrient solution, and wherein the second chamber is configured to receive a portion of the nutrient solution from the first chamber and provide the portion of the nutrient solution back to the reservoir to further mix the nutrient solution.

2. The plant nutrient system of claim 1, wherein the measuring device is further configured to provide the fluid to the reservoir.

3. The plant nutrient system of claim 1, wherein the first chamber is further configured to house a first portion of the nutrient solution from the pump, and the second chamber is configured to provide a second portion of the nutrient solution from the pump to the reservoir.

4. The plant nutrient system of claim 1, wherein the test kit is configured to interact with the nutrient solution from a bottom portion of the reservoir.

5. The plant nutrient system of claim 1, wherein the test kit is configured to interact with the nutrient solution to provide an additional test result relating to the nutrient solution.

6. The plant nutrient system of claim 1, wherein the test result is at least one of a potential of Hydrogen (pH) reading, an electrical conductivity reading, or a total dissolved solids reading.

7. The plant nutrient system of claim 1, wherein the mixer further comprises a spring-loaded handle coupled to a lid of the reservoir with the single grated paddle positioned within the reservoir, wherein the plurality of orifices of the single grated paddle are arranged in rows, the plurality of orifices configured to receive a portion of the fluid and a portion of the nutrient, and wherein in response to the mixer being manipulated the single grated paddle is configured to aerate the nutrient solution.

8. The plant nutrient system of claim 7, wherein in response to the spring-loaded handle being manipulated, the single grated paddle is configured to move in the vertical direction to mix the fluid and the predetermined amount of nutrient in the reservoir to aerate the nutrient solution.

9. The plant nutrient system of claim 1, wherein the pump is positioned at a bottom portion of the reservoir and the pump is configured to move the nutrient solution at the bottom portion of the reservoir from the reservoir.

10. The plant nutrient system of claim 9, wherein the pump is configured to move the nutrient solution through components of the plant nutrient system and back to the reservoir to mix the nutrient solution, and to the first chamber to interact with the test kit to provide the test result relating to the nutrient solution.

11. The plant nutrient system of claim 1, further comprising a delivery manifold and a first nutrient tube coupled to the delivery manifold, wherein the delivery manifold is configured to receive the nutrient solution from the pump and the first nutrient tube is configured to provide a first portion of the nutrient solution to a first plant.

12. The plant nutrient system of claim 11, further comprising a second nutrient tube coupled to the delivery manifold, wherein the second nutrient tube is configured to provide a second portion of the nutrient solution to a second plant.

13. The plant nutrient system of claim 11, further comprising a cleaning device configured to house a cleaning solution.

14. The plant nutrient system of claim 13, wherein the cleaning device is configured to selectively couple with the delivery manifold and provide the cleaning solution to the delivery manifold to remove excess nutrient solution from the delivery manifold.

15. A kit, comprising:
a reservoir configured to receive a fluid and a predetermined amount of nutrient;
a measuring device configured to couple to the reservoir and to provide the predetermined amount of nutrient to the reservoir;
a rinse device coupled with the measuring device, the rinse device configured to provide a rinse solution to the measuring device to remove residual nutrient from the measuring device;

a mixer configured to be manipulated in a vertical direction to selectively mix the fluid and the predetermined amount of nutrient to form a nutrient solution, wherein the mixer includes a single grated paddle including a body and a plurality of orifices, wherein each orifice of the plurality of orifices extends through the body of the paddle perpendicular to the vertical direction and have the same size, and wherein each of the plurality of orifices is configured to aerate the nutrient solution within the reservoir;
a pump configured to selectively mix the fluid and the predetermined amount of nutrient to form the nutrient solution and move the nutrient solution from the reservoir; and
a chamber having a first chamber and a second chamber, the first chamber positioned within the second chamber and in fluid communication with the second chamber, wherein the first chamber houses a test kit and is configured to receive the nutrient solution such that the test kit interacts with the nutrient solution and provides a test result relating to the nutrient solution, and wherein the second chamber is configured to receive a portion of the nutrient solution from the first chamber and provide the portion of the nutrient solution back to the reservoir to further mix the nutrient solution.

* * * * *